United States Patent
Seo

(10) Patent No.: US 10,353,641 B2
(45) Date of Patent: Jul. 16, 2019

(54) STORAGE SYSTEM AND METHOD OF MANAGING VOLUMES THEREOF BASED ON RECEIVED CORRELATION INFORMATION OF THE VOLUMES

(71) Applicant: SAMSUNG ELECTRONICS CO., LTD., Suwon-si, Gyeonggi-do (KR)

(72) Inventor: Jung-Min Seo, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/448,667

(22) Filed: Mar. 3, 2017

(65) Prior Publication Data

US 2017/0344312 A1  Nov. 30, 2017

(30) Foreign Application Priority Data

May 31, 2016 (KR) .................. 10-2016-0067750

(51) Int. Cl.
  *G06F 3/06* (2006.01)
  *G06F 11/10* (2006.01)
  *G06F 12/0871* (2016.01)
  *G06F 12/109* (2016.01)

(52) U.S. Cl.
  CPC .......... *G06F 3/0689* (2013.01); *G06F 3/061* (2013.01); *G06F 3/0644* (2013.01); *G06F 3/0647* (2013.01); *G06F 3/0665* (2013.01); *G06F 11/102* (2013.01); *G06F 11/1076* (2013.01); *G06F 12/0871* (2013.01); *G06F 12/109* (2013.01); *G06F 3/0638* (2013.01); *G06F 2211/1004* (2013.01); *G06F 2211/1009* (2013.01); *G06F 2212/262* (2013.01)

(58) Field of Classification Search
  CPC .......... G06F 3/689; G06F 3/644; G06F 3/647; G06F 3/667
  See application file for complete search history.

(56) References Cited

U.S. PATENT DOCUMENTS

| | | |
|---|---|---|
| 6,681,310 B1 | 1/2004 | Kusters et al. |
| 6,715,054 B2 | 3/2004 | Yamamoto |
| 7,424,637 B1 | 9/2008 | Schoenthal et al. |
| 7,949,847 B2 | 5/2011 | Murase |
| 7,966,470 B2 | 6/2011 | Sakurai et al. |
| 8,281,102 B2 | 10/2012 | Oe et al. |
| 8,285,952 B2 | 10/2012 | Arakawa et al. |
| 8,392,678 B2 | 3/2013 | Inoue et al. |
| 8,533,420 B2 | 9/2013 | Goebel et al. |
| 8,554,996 B2 | 10/2013 | Long et al. |
| 8,601,312 B2 | 12/2013 | Daikokuya et al. |
| 2009/0216986 A1* | 8/2009 | Sakurai ................ G06F 3/0607 711/170 |
| 2010/0217933 A1 | 8/2010 | Oe et al. |

(Continued)

*Primary Examiner* — Than Nguyen
(74) *Attorney, Agent, or Firm* — Volentine, Whitt & Francos, PLLC

(57) ABSTRACT

A storage system includes a plurality of storage media and a method of managing volumes of the storage system is applied thereto. The method includes receiving a volume management request and correlation information between the volumes, and allocating storage spaces of the storage media to the volumes based on the correlation information between the volumes. The correlation information indicates information of the volumes in which the allocated storage media are physically isolated from each other.

13 Claims, 32 Drawing Sheets

(56) References Cited

U.S. PATENT DOCUMENTS

| | | | |
|---|---|---|---|
| 2011/0138143 A1* | 6/2011 | Seki | G06F 3/0608 711/165 |
| 2011/0191536 A1* | 8/2011 | Mizuno | G06F 3/0611 711/114 |
| 2015/0160885 A1* | 6/2015 | Hara | H04L 61/10 710/74 |
| 2018/0150246 A1* | 5/2018 | Catrein | G06F 3/0619 |

* cited by examiner

FIG. 10A

| Vol. | Related Vol. |
|---|---|
| A | B |
| B | A |
| C | D, E, F |
| D | C, E, F |
| E | C, D, F |
| F | C, D, E |

FIG. 10B

| Vol. | Related Vol. | RAID Level |
|---|---|---|
| A | B | RAID 1 |
| B | A | RAID 1 |
| C | D, E, F | RAID 5 |
| D | C, E, F | RAID 5 |
| E | C, D, F | RAID 5 |
| F | C, D, E | RAID 5 |

FIG. 11A

| Vol. | SSD ID | LBA (Start/End) | Capacity | Free Space |
|------|--------|-----------------|----------|------------|
| A | SSD1 | Info_ADD | 100G | 30G |
| B | SSD2, SSD3 | Info_ADD | 100G | 30G |
| C | SSD1 | Info_ADD | 500G | 400G |
| ⋮ | ⋮ | ⋮ | ⋮ | ⋮ |

FIG. 11B

| Disk | W_Num | E_Num | BER | Defect |
|------|-------|-------|-----|--------|
| SSD1 | CNT1_1 | CNT2_1 | Val_1 | A |
| SSD2 | CNT1_2 | CNT2_2 | Val_2 | A |
| SSD3 | CNT1_3 | CNT2_3 | Val_3 | N |
| ⋮ | ⋮ | ⋮ | ⋮ | ⋮ |

FIG. 13B

| Vol. | SSD ID | LBA (Start/End) | Capacity | Free Space |
|------|--------|-----------------|----------|------------|
| A | SSD1 | Info_ADD | Info_cap | Info_FS |
| B | SSD2, SSD3 | Info_ADD | Info_cap | Info_FS |
| C | SSD3 | Info_ADD | Info_cap | Info_FS |
| ⋮ | ⋮ | ⋮ | ⋮ | ⋮ |

STORAGE SYSTEM AND METHOD OF MANAGING VOLUMES THEREOF BASED ON RECEIVED CORRELATION INFORMATION OF THE VOLUMES

CROSS-REFERENCE TO RELATED APPLICATION

This application claims the benefit of Korean Patent Application No. 10-2016-0067750, filed on May 31, 2016, in the Korean Intellectual Property Office, the disclosure of which is incorporated herein in its entirety by reference.

BACKGROUND

The present disclosure relates to a storage system and a method of managing volumes thereof.

In general, a storage system, that is, a system shared by two or more hosts, uses a redundant array of inexpensive disks (RAID) so that a plurality of low-capacity disks may operate as one virtual high-capacity disk. RAID may be implemented in various ways. For example, RAID may be implemented via hardware RAID or software RAID. In the case of software RAID, a function of combining a plurality of disks mounted on a computer into a RAID may be provided and an algorithm (e.g., a RAID algorithm) may be used to allow an operating system of a disk management system to perform a RAID-related function.

However, overhead may increase when the storage system uses the RAID algorithm, thereby causing an increase in a bottleneck of data input and output operations. This may mean that the performance of the storage system decreases.

SUMMARY

Provided are a storage system which may provide improved data stability and reduced overhead for a data access, and a volume management method thereof.

Additional aspects will be set forth in part in the description which follows and, in part, will be apparent from the description, or may be learned by practice of the presented embodiments.

According to an aspect of an embodiment, method of managing volumes of a storage system that comprises: a plurality of storage media includes receiving a volume management request and correlation information between the volumes, and allocating storage spaces of the storage media to the volumes based on the correlation information between the volumes. The correlation information indicates information of volumes in which the allocated storage media are physically isolated from each other.

According to an aspect of another embodiment, a method includes: receiving a management request for a first volume and first RAID information comprising information about one or more volumes associated with the first volume, updating the first RAID information in a first table, receiving a management request for a second volume and second RAID information comprising information about one or more volumes associated with the second volume, and updating the second RAID information in the first table.

According to an aspect of yet another embodiment, a computing system includes: a storage system, a memory that stores programs associated with volume management and allocation of storage spaces in the storage system, and a processor that executes the programs stored in the memory. As the programs are executed, the processor controls an operation of storing correlation information between volumes received by the storage system from an external device, and controls an operation of allocating the storage spaces such that storage media allocated to correlated volumes are physically isolated from each other, based on the correlation information between the volumes.

According to an aspect of still another embodiment, a method of managing volumes in a storage system includes: receiving a request for creation of a first volume and first RAID information corresponding to the first volume, receiving a request for creation of a second volume and second RAID information corresponding to the second volume, and selecting a first disk of which a storage space is allocated to the first volume and a second disk of which a storage space is allocated to the second volume, based on the first and second RAID information.

According to an aspect of a further embodiment, a storage system includes: a storage device comprising a plurality of storage media having a plurality of storage spaces; a processing unit; and a memory configured to store therein instructions executable by the processing unit to cause the processing unit to manage volumes in the storage device by assigning storage spaces of the storage media to the volumes based on correlation information between the volumes. The correlation information indicates information of the volumes in which the allocated storage media are physically isolated from each other.

BRIEF DESCRIPTION OF THE DRAWINGS

These and/or other aspects will become apparent and more readily appreciated from the following description of the embodiments, taken in conjunction with the accompanying drawings.

FIGS. 10A and 10B are views illustrating implementation of a volume relationship table of FIG. 9.

FIGS. 11A and 11B are views illustrating an example of table information including volume metadata and disk status information.

FIGS. 13A and 13B are a block diagram and a table illustrating an example of allocating storage spaces to volumes.

DETAILED DESCRIPTION

Figure 1:
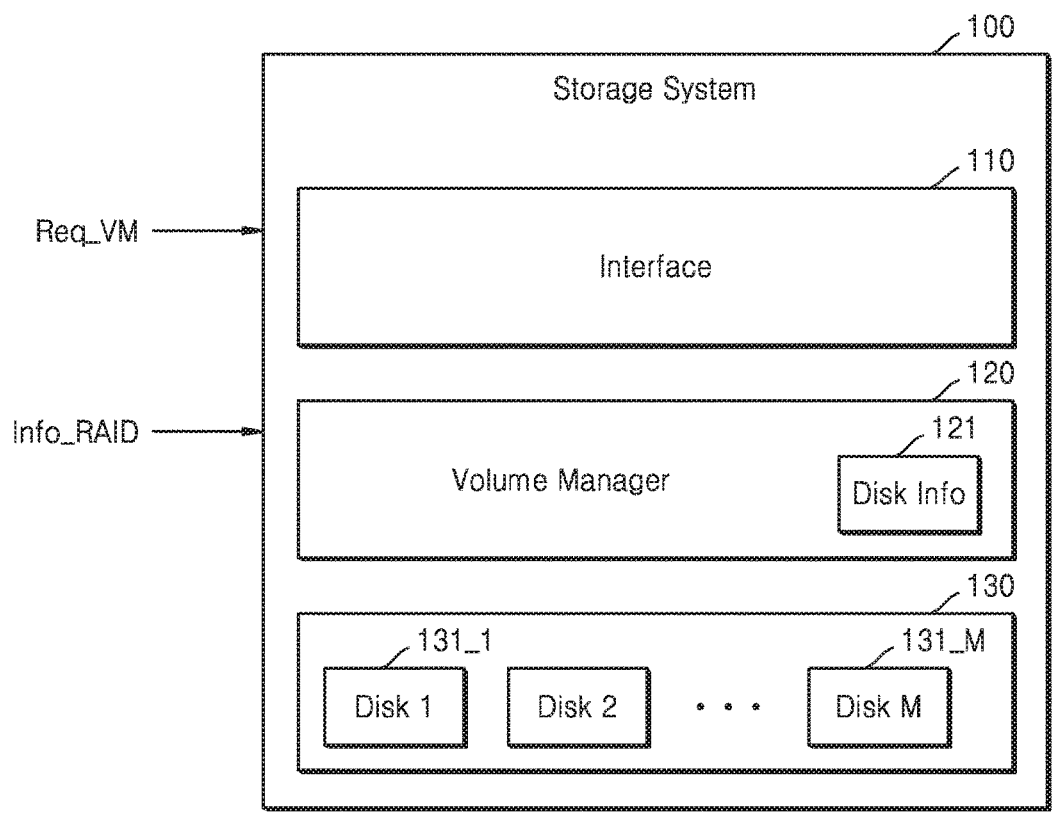
FIG. 1 is a block diagram illustrating an embodiment of a storage system.

Below, various embodiments will be described in detail with reference to accompanying drawings. As is traditional in the field of the inventive concepts, some embodiments and/or components thereof are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram illustrating an embodiment of a storage system.

Referring to FIG. 1, a storage system 100 may include an interface 110, a volume manager 120, and a storage device 130. Storage device 130 may include a plurality of storage media. A storage medium may be implemented with various kinds of storage devices. For example, storage device 130 may include various kinds of disks. Also, storage device 130 may include disks of the same kind and/or disks of different kinds. According to an embodiment, storage device 130 may include one or more hard disk drives (HDDs) and/or one or more solid state drives (SSDs) as the above-described storage media.

Each SSD may include a plurality of memory chips (e.g., flash memory chips). In this case, the above-described storage medium may be an element that is referred to as the SSD, or may be an element that is referred to as a memory chip. Alternatively, storage device 130 according to an embodiment may be defined as including a plurality of memory chips as the above-described storage media without needing to apply the concept of the above-described disk.

Below, it is assumed that storage device 130 includes "M" disks 131_1 to 131_M.

Storage system 100 may communicate with one or more hosts through interface 110 and may perform a data access operation in response to a request from each host. According to an embodiment, storage system 100 may communicate with the host(s) through various interfaces, such as universal serial bus (USB), multimedia card (MMC), PCIExpress (PCI-E), AT attachment (ATA), serial ATA (SATA), parallel ATA (PATA), small computer system interface (SCSI), serial attached SCSI (SAS), enhanced small disk interface (ESDI), and integrated drive electronics (IDE).

Storage system 100 may receive a volume management request Req_VM from a host to perform one of the following volume management operations: an operation of creating a volume requested by the host, an operation of changing a volume, for example, an operation of expanding or reducing the volume, or an operation of allocating a physical storage space of a disk to the volume. Furthermore, when the volume management request Req_VM corresponds to a data access request, storage system 100 may perform the volume management operation, for example, an operation of writing or reading data in or from the volume. The volume provided to the host may correspond to a logical device that includes one or more physical disks. That is, a plurality of physical disks may be provided to the host as one logical volume.

Storage system 100 may receive correlation information among volumes from an external device outside the storage system, together with the volume management request Req_VM. For example, storage system 100 may receive the correlation information indicating a correlation of data between at least two volumes when receiving a creation request for the at least two volumes. The correlation information may indicate that the at least two volumes are correlated to each other upon accessing of data. Also, the correlation information may indicate information about at least two volumes to which storage media are allocated to be physically isolated from each other. Here, that the storage media are physically isolated from each other may refer to that storage spaces of different memory chips are respectively allocated to at least two volumes. Alternatively, that the storage media are physically isolated from each other may refer to that storage spaces of different disks are respectively allocated to the at least two volumes.

According to an embodiment, the host may be allocated with volumes from storage system 100 and may combine the allocated volumes into a RAID. For example, the host may perform a RAID algorithm for combining the allocated volumes into the RAID, and information about a volume to be allocated, information (e.g., RAID level information) about the RAID that the volumes constitute, etc. may be provided to storage system 100 through a program (e.g., an application programming interface) installed on the host.

The correlation information may be variously defined in connection with the RAID. For example, the correlation information may include information of volumes that constitute one RAID. Alternatively, the correlation information may include information which indicates a level of a RAID constituted by volumes, together with information of the volumes constituting the RAID. As another example, the correlation information may include information of a group including volumes constituting one RAID and may further include information indicating a level of the RAID that is applied to the group.

As described above, since the correlation information includes information about a RAID applied to volumes that need management, the provision of the correlation information may refer to the provision of RAID information Info_RAID to storage system 100 for each volume. Below, the terms "correlation information" and "RAID information" may be interchangeably used according to embodiments. For example, the host may provide the RAID information Info_RAID to the host together with the volume management request Req_VM based on the correlation between volumes. Also, storage system 100 may perform the volume management operation based on the RAID information Info_RAID. For example, storage system 100 may determine correlation information between volumes based on the RAID information Info_RAID, and may perform the volume management operation based on the correlation information.

In addition, in an operation where storage system 100 stores the correlation information between the volumes therein, the RAID information Info_RAID may be directly stored in storage system 100 as the correlation information, or correlation information which is generated as the result of determining the RAID information Info_RAID may be stored in storage system 100. According to embodiments, the RAID information Info_RAID and the correlation information may be defined in various ways. The RAID information Info_RAID and the correlation information are interchangeably used and have the same meaning.

According to an embodiment, the RAID information Info_RAID, which is provided to correspond to a first volume, may include information of a second volume correlated to the first volume. When the RAID information Info_RAID includes information indicating that a level of RAID 1 is applied to the first and second volumes, storage system 100 may determine that the host uses the first and second volumes after combining the first and second volumes into RAID 1.

Also, storage system 100 may perform the volume management operation based on the received RAID information Info_RAID (or correlation information). According to an embodiment, when a storage space of a disk is allocated to each volume, an operation of allocating the storage space to each volume may be controlled on the basis of the RAID information Info_RAID. For example, whether a defect (or a physically allocated storage space) needs to be isolated between at least two volumes may be determined on the basis of the RAID information Info_RAID. A way of allocating the storage space may change according to whether there is a need to isolate the defect.

According to an embodiment, when the creation of two volumes (e.g., a first volume and a second volume) is requested and when the RAID information Info_RAID indicating a level of RAID 1 for each volume is received, storage system 100 may create the first volume and the second volume that constitute RAID 1. As the host uses the first and second volumes as RAID 1, original data may be stored in any one of the first and second volumes, and the same data (e.g., mirror data) as the original data may be stored in the other thereof.

Alternatively, when the creation of three or more volumes (e.g., first to n-th volumes) is requested and when the RAID information Info_RAID indicating a level of RAID 5 or RAID 6 is received for each volume, storage system 100 may create the first to n-th volumes that constitute RAID 5 or RAID 6. For example, in the case where three volumes constitute RAID 5, data may be stored in two of the three volumes, and parity information corresponding to the data may be stored in the third volume.

According to an embodiment, storage system 100 may store and manage correlation information between volumes in a memory (a volatile memory or a nonvolatile memory) of storage system 100. For example, if the volume management request Req_VM and the RAID information Info_RAID corresponding to the volume management request Req_VM are provided from the host, storage system 100 may store the received RAID information Info_RAID in the memory, and thus the correlation information between the volumes may be updated. Also, when a physical storage space is allocated to each volume, an allocation operation may be controlled on the basis of the RAID information Info_RAID from the host.

According to an embodiment, disk information may be additionally used to allocate the storage space. An embodiment is exemplified in FIG. 1 as a volume manager 120 includes a memory 121 storing the disk information. However, embodiments are not limited thereto. For example, the disk information may be stored at various locations in storage system 100.

The disk information may include information of various kinds. For example, storage device 130 may include a plurality of disks 131_1 to 131_M. The disk information, which is system information, may include a variety of information such as the number of disks, identifiers (IDs) of the disks, kinds of the disks, performance, and storage capacity.

Furthermore, the disk information may include state information of disks 131_1 to 131_M. The status information may include, for example, error state information and/or life cycle state information of each of disks 131_1 to 131_M. For example, in the case where each of disks 131_1 to 131_M corresponds to an SSD including flash memories, the probability that a defect occurs may be predicted for each of disks 131_1 to 131_M, based on information such as a program/erase frequency or a bit error rate (BER) of each of disks 131_1 to 131_M.

Volume manager 120 may perform the volume management operation based on a combination of the RAID information Info_RAID and the disk information. That is, volume manager 120 may not just randomly allocate any disk (or a storage space) to each volume, but it may determine the RAID information Info_RAID and the disk information and may allocate a disk to each volume based on the determination result.

For example, in the first and second volumes constituting RAID 1, if data of the first volume is lost, data stored in the second volume needs to be provided to the host. For the stability of data, volume manager 120 may respectively allocate storage spaces of different physical disks to the first and second volumes such that a defect is isolated between the first and second volumes constituting RAID 1. That is, volume manager 120 may perform an allocation operation such that a storage space of a disk or storage medium allocated to the first volume and a storage space of a disk or storage medium allocated to the second volume are physically isolated from each other.

Also, to secure the stability of data of the first and second volumes constituting RAID 1, there is a need to reduce the probability that defects occur at the first and second volumes at the same time. Status information of each of disks 131_1 to 131_M included in storage device 130 may be determined on the basis of the result of determining the disk information. Accordingly, it may be possible to determine disks in which the probability that a defect occurs is high (e.g., greater than a threshold, or greater than the average of all of the disks), and disks in which the probability that a defect occurs is low (e.g., less than a threshold, or less than the average of all of the disks). Furthermore, each disk may include a plurality of storage media. In this case, the probability of occurrence of defects may be determined in units of storage media. Alternatively, each storage medium may include a plurality of areas. In this case, the probability of occurrence of defects may be determined in units of areas. In the case of allocating a storage space to each of the first and second volumes, a storage space, in which the probability that a defect occurs is relatively low (e.g., less than a threshold, or less than the average for all of the possible storage spaces) (or a storage space having a relatively long life cycle (e.g., greater than a threshold, or greater than the average for all of the possible storage spaces), may be allocated to at least one volume, and thus the stability of data may be secured.

Meanwhile, storage system 100 may have a path for receiving the RAID information Info_RAID from an external device outside storage system 100, and a path, through which the RAID information Info_RAID is transmitted, may be variously set. For example, an in-band channel for transmitting and receiving prearranged signals may be provided between storage system 100 and the host (or an administrator system managing storage system 100), or an out-of-band channel for transmitting and receiving additional signals may be provided therebetween. The above-described correlation information may be transmitted through the in-band channel or out-of-band channel.

Meanwhile, the RAID information Info_RAID may be transmitted in various cases. For example, the RAID information Info_RAID may be provided to storage system 100 upon creation of volumes or change of volumes, such as expansion or reduction. In addition, an operation of allocating a storage space based on the RAID information Info_RAID may be performed in various cases. For example, the allocation operation may be performed upon creation/expansion/reduction of volumes and/or may be dynamically performed whenever writing data.

In the above-described embodiment, it is described that the RAID information Info_RAID is provided for each volume. However, embodiments are not limited thereto. For example, a system may be designed such that the RAID information Info_RAID indicating that two or more previously created volumes are correlated to each other is provided to storage system 100 independently of a volume creation request.

According to the above-described embodiment, storage system 100 may store data of the host stably without separate software (or a separate program) for executing the RAID algorithm. In a conventional case, when the RAID algorithm is performed by the host, the host utilizes volumes allocated from the storage system after combining the volumes into a RAID. In such a conventional case, since the storage system performs an operation in which storage spaces are allocated to volumes regardless of the RAID before provided to the host, a defect may not be appropriately isolated between the volumes, thereby causing a decrease in the stability of data. However, according to the above-described embodiment, since overhead of storage system 100 due to execution of the RAID algorithm is absent, a speed at which data is stored may be improved. Furthermore, since a defect is isolated between volumes based on the RAID information and/or disk information provided from the outside, the stability of data may be improved.

Figure 2:
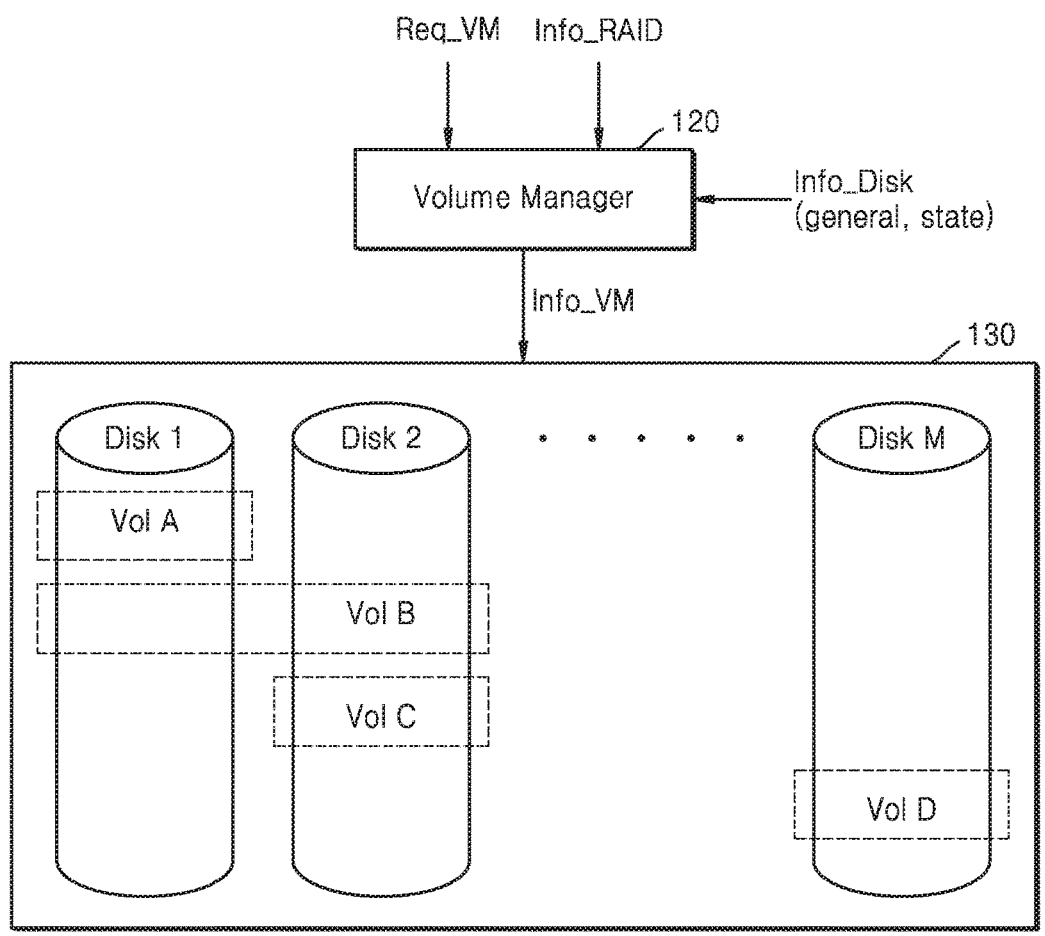
FIG. 2 is a block diagram illustrating an example of an allocation operation of the storage system illustrated in FIG. 1.

FIG. 2 is a block diagram illustrating an example of an allocation operation of the storage system illustrated in FIG. 1. Below, it is assumed that storage system 100 receives the RAID information Info_RAID as correlation information between volumes. However, as described above, the RAID information Info_RAID may be variously defined. In some embodiments, the RAID information Info_RAID may be defined as the same concept as the correlation information between the volumes.

Referring to FIGS. 1 and 2, volume manager 120 may perform a management operation, such as an operation of creating, expanding, and reducing a volume, in response to a request from the host. As in the above-described embodiment, volume manager 120 may store and manage the RAID information Info_RAID from the outside and may perform the volume management operation based on the RAID information Info_RAID. Also, according to an embodiment, volume manager 120 may allocate one or more disks (or a storage space of a disk) to a volume based on a combination of the RAID information Info_RAID from the outside and disk information Info_Disk stored in storage system 100. The disk information Info_Disk may include information indicating statuses of disks 131_1 to 131_M together with general information of disks 131_1 to 131_M of storage device 130.

In a volume creation and allocation operation, for example, volume manager 120 may perform a management operation for creating a volume and allocating a storage space, in response to the volume management request Req_VM from the outside. Also, volume manager 120 may output the information info_VM about volume management to back up the RAID information Info_RAID or metadata indicating the allocation result to storage device 130.

A storage space using disks 131_1 to 131_M may be allocated under control of volume manager 120. A storage space of a physical disk may be allocated to a first volume Vol A. For example, a storage space of a first disk "Disk 1" may be allocated to the first volume Vol A. In contrast, a storage space of two or more physical disks may be allocated to a second volume Vol B. For example, physical spaces of a first disk Disk 1 and a second disk Disk 2 may be allocated to the second volume Vol B.

The above-described allocation operation may be performed on the basis of the RAID information Info_RAID. For example, in the case where the RAID information Info_RAID, which is provided from the host and corresponds to the first and third volumes Vol A and Vol C, indicates RAID 1, volume manager 120 may allocate a storage space to the first and third volumes Vol A and Vol C based on the RAID information Info_RAID. For example, that the first and third volumes Vol A and Vol C are volumes constituting RAID 1 may be determined on the basis of the RAID information Info_RAID, and the allocation operation may be performed such that a defect is isolated between the first volume Vol A and the third volume Vol C. For example, a storage space may be allocated such that a physical disk allocated to the first volume Vol A and a physical disk allocated to the third volume Vol C are different from each other.

According to an embodiment, in the case where the RAID information Info_RAID is not received or where the RAID information Info_RAID does not need defect isolation between volumes (e.g., where RAID 0 is applied to each volume), volume manager 120 may appropriately allocate the remaining storage space of disks 131_1 to 131_M included in storage device 130 to a volume.

Figure 3:
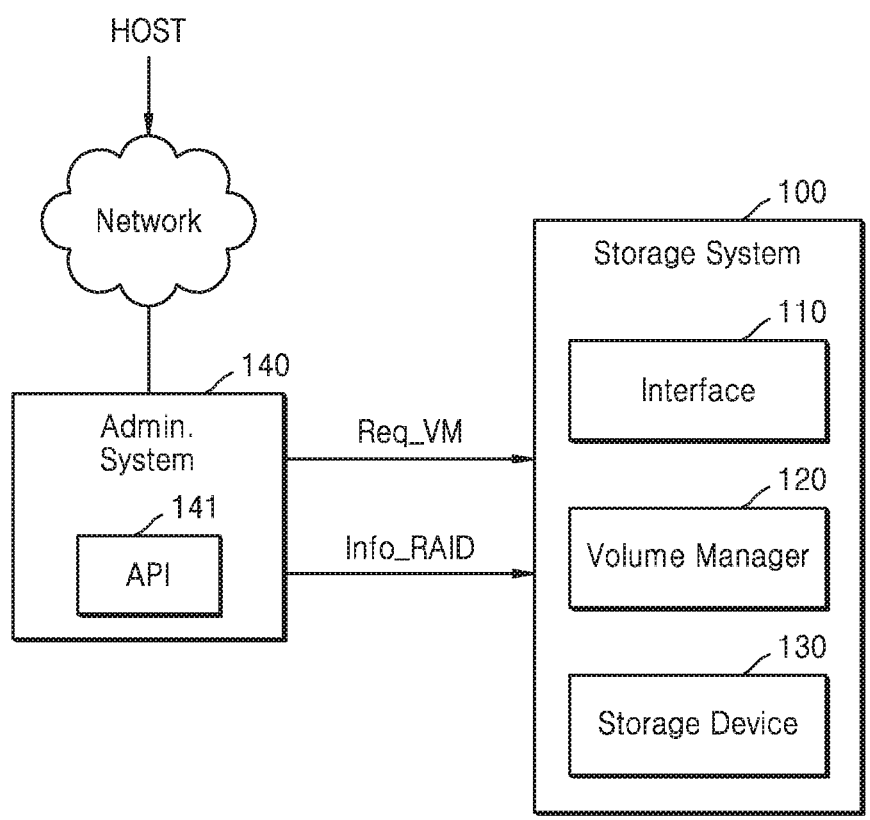
FIG. 3 is a block diagram illustrating an example of a computing system including an embodiment of a storage system.

FIG. 3 is a block diagram illustrating an example of a computing system to which an embodiment of a storage system is applied.

Referring to FIG. 3, storage system 100 may include interface 110, volume manager 120, and storage device 130. Also, an administrator system 140, which manages storage system 100, may be connected to storage system 100 through a wired/wireless network. For example, storage system 100 and administrator system 140 may constitute a system (e.g., a cloud system) that provides a storage service to one or more hosts. Alternatively, storage system 100 and administrator system 140 may correspond to one local system. Storage system 100 may provide storage resources for the local system, and administrator system 140 may correspond to a local host that utilizes a resource of storage system 100 by using an operating system and a file system. Alternatively, administrator system 140 may correspond to an element included in storage system 100.

Administrator system 140 may communicate with an external host "HOST" over a network and may receive the volume management request Req_VM and the RAID information Info_RAID as correlation information corresponding to the volume management request Req_VM from the host "HOST". Administrator system 140 may send the volume management request Req_VM and the RAID information Info_RAID from the host "HOST" to storage device 130.

As an embodiment, an application programming interface (API) 141 may be installed on administrator system 140 such that an administrator, which operates administrator system 140, manually performs volume management in response to a request from the host "HOST". Also, as additional code is added to API 141, an interface, such as a graphical user interface (GUI) or a DOS window, may be provided to the administrator. The administrator may input information for volume management according to a request from the host "HOST" through API 141, and administrator system 140 may generate the volume management request Req_VM and/or the RAID information Info_RAID based on the received information and may provide the volume management request Req_VM and/or the RAID information Info_RAID to storage device 130.

Figure 4:
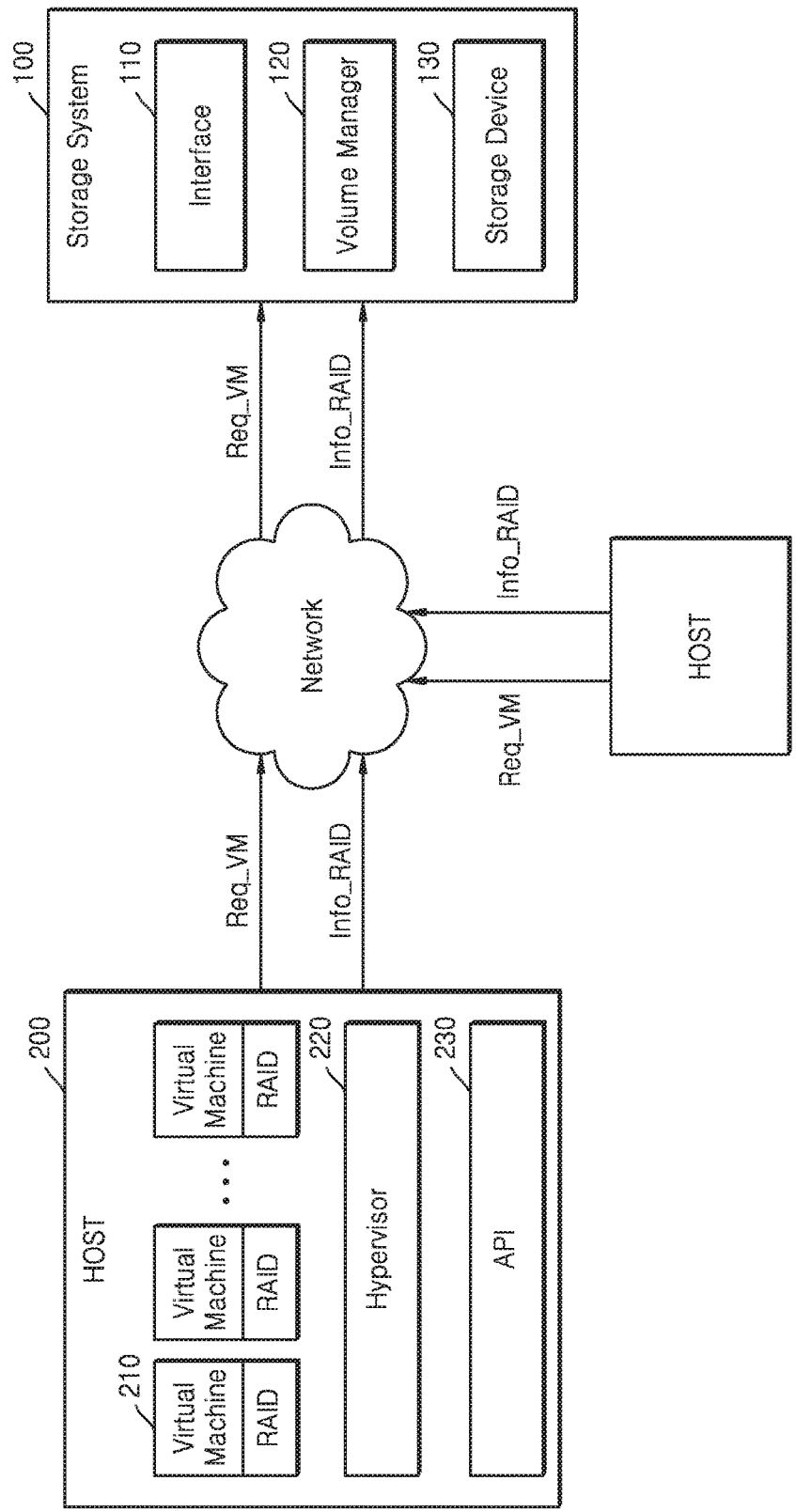
FIG. 4 is a block diagram illustrating another example of the computing system including an embodiment of a storage system.

FIG. 4 is a block diagram illustrating another example of a computing system to which an embodiment of a storage system is applied.

Referring to FIG. 4, storage system 100 may communicate with a plurality of hosts over a network and may perform the volume management operation in response to a request from each host. Storage system 100 may include interface 110, volume manager 120, and storage device 130.

Referring to any one host 200, host 200 may support a plurality of virtual machines 210, and a hypervisor 220 may allow virtual machines 210 to access a resource of storage system 100. Each virtual machine 210 may provide the volume management request Req_VM to storage system 100 by executing an operating system independently of host 200. When viewed from storage system 100, each virtual machine 210 may correspond to an independent computing system that utilizes a storage space. In the case where a small computer system interface (SCSI) is applied to the computing system of FIG. 4, host 200 may perform an initiator function that provides a request for execution of data access, and storage system 100 may perform a function of a target that executes the data access.

Also, the RAID algorithm may be applied to host 200 for a stable data access, and each virtual machine 210 may provide storage system 100 with a data access request, which is based on the RAID function, by executing the RAID algorithm. According to the above-described embodiment, each virtual machine 210 may generate the volume management request Req_VM and the RAID information Info_RAID and may provide them to storage system 100 over a network. As in the above-described embodiment, an API 230 may be installed on host 200 for a user (or administrator) interface.

Although not illustrated in FIG. 4, host 200 may perform a data access operation with respect to storage system 100 based on various operating systems and file systems. For example, there may be used a file system such as a file allocation table (FAT) or new technology file system (NTFS) file system of the Windows-based operating system or various file systems such as an Unix file system (UFS), Extended 2 (EXT2), Extended 3 (EXT3), and journaled file system (JFS) of the Unix/Linux-based operating system.

Figure 5:
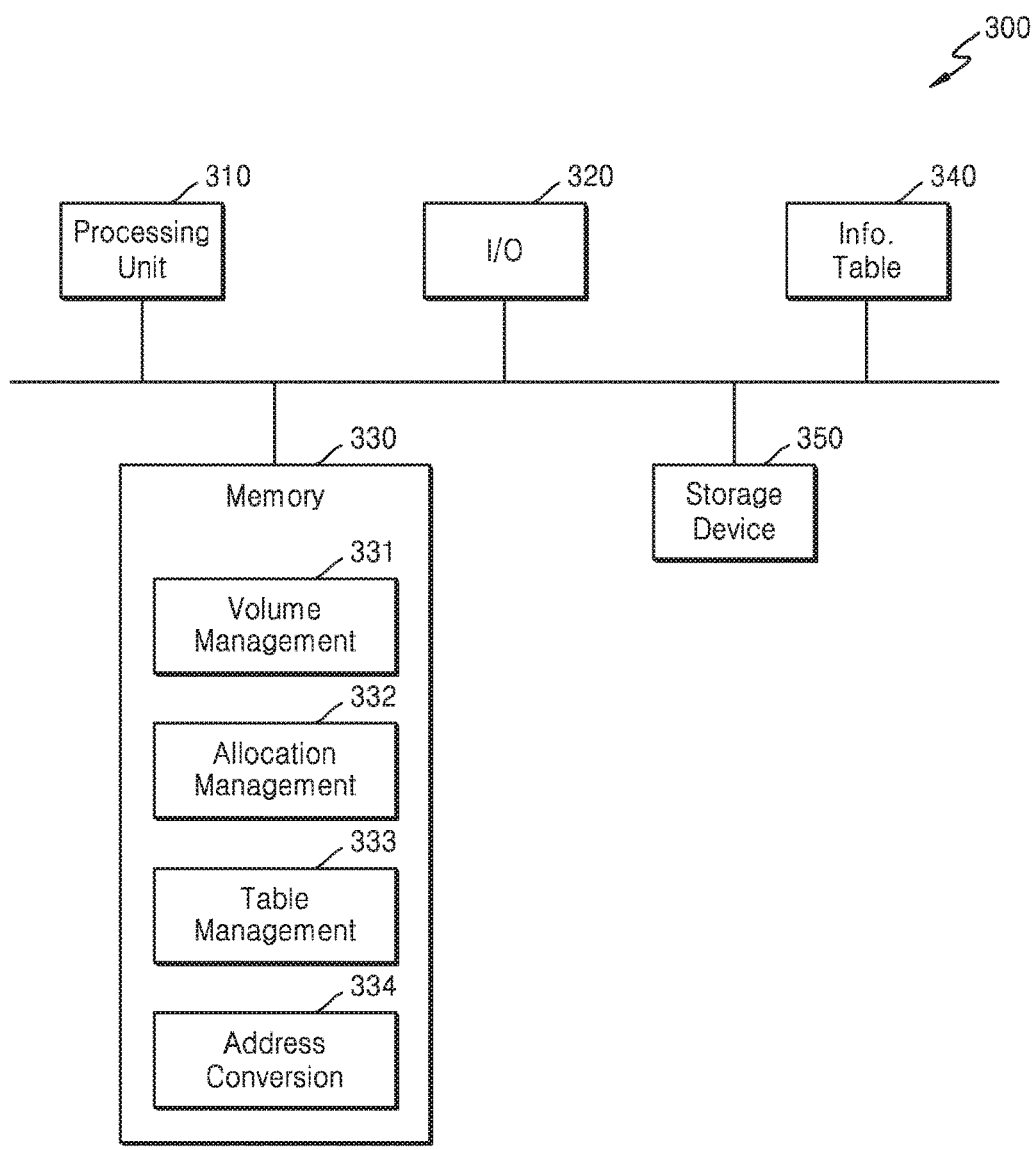
FIG. 5 is a block diagram illustrating a hardware configuration of an embodiment of a storage system.

FIG. 5 is a block diagram illustrating a hardware configuration of an embodiment of a storage system.

Referring to FIG. 5, a storage system 300 may include a processing unit 310, an input/output (I/O) unit 320, a working memory 330, an information table 340, and a storage device 350. As in the above description, storage system 300 may perform the volume management operation based on RAID information, and storage device 350 may include a plurality of disks.

The volume management operation according to embodiments may be performed by processing unit 310 executing software loaded or stored in working memory 330. The software may be stored in a memory (e.g., a nonvolatile memory) of storage system 300 and may be loaded in working memory 330. According to an embodiment, working memory 330 may be implemented with a volatile memory or a nonvolatile memory as a non-transitory computer-readable medium. For example, working memory 330 may be implemented with a random access memory (RAM), a read only memory (ROM), an electrically erasable programmable ROM (EEPROM), or a flash memory or by any other memory technology.

Software stored in working memory 330 may be divided into a plurality of modules based on functions. For example, the software stored in working memory 330 may include a volume management module 331, an allocation management module 332, a table management module 333, and an address conversion module 334.

Processing unit 310 may execute volume management module 331 to perform the volume management operation such as a volume creation operation, a volume expansion operation, or a volume reduction operation. Also, processing unit 310 may execute allocation management module 332 to manage an operation of allocating a storage space to each volume. Furthermore, processing unit 310 may execute table management module 333 to perform an operation of storing and updating a variety of information associated with the volume management operation. According to an embodiment, a table including correlation information between volumes and/or information about a RAID level may be included in storage system 300. Also, a table including information about a physical disk included in storage system 300 may be provided. Information of the above-described tables may be managed according to the execution result of table management module 333.

Meanwhile, processing unit 310 may execute address conversion module 334 to translate a logical address of data access-requested by a host into a physical address indicating a physical storage location of storage device 350.

Figure 6:
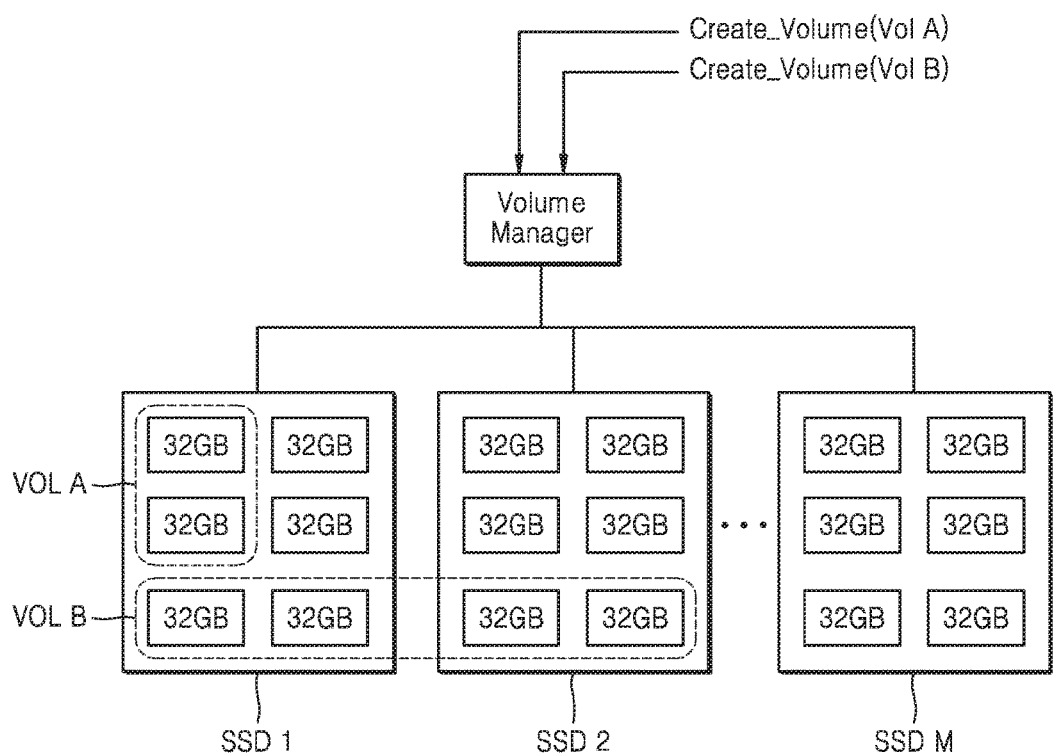
FIG. 6 is a block diagram illustrating an example in which storage spaces are allocated to volumes in a conventional way.

FIG. 6 is a block diagram illustrating an example in which storage spaces are allocated to volumes based on a conventional way. An example, in which a host combines a volume "A" and a volume "B" into RAID 1 and a storage system allocates storage spaces to the volumes "A" and "B" without using RAID information, is illustrated in FIG. 6.

The host may include the RAID algorithm for combination of volumes into a RAID. The host may request the storage system to create two volumes Vol A and Vol B that will constitute RAID 1. The storage system may include "M" physical disks. For example, an example in which the storage system includes "M" SSDs SSD 1 to SSD M is illustrated in FIG. 6.

If the host requests the creation of the two volumes Vol A and Vol B constituting RAID 1, the storage system may create the volumes Vol A and Vol B in response to the request of the host and may randomly allocate storage spaces of the "M" SSDs SSD 1 to SSD M to the volumes, respectively. An example, in which a storage space of a portion of a first SSD "SSD 1" is allocated to the volume A Vol A, and a storage space of any other portion of the first SSD "SSD 1" and a storage space of a portion of a second SSD "SSD 2" are allocated to the volume B Vol B, is illustrated in FIG. 6.

In a write operation, for example, as the host provides a data write request based on a level of RAID 1, original data may be stored in the first SSD "SSD 1" allocated to the volume Vol A, and mirror data thereof may be stored in the first SSD "SSD 1" and the second SSD "SSD 2" allocated to the volume B Vol B. In the case where data is lost due to a defect occurring at the first SSD "SSD 1", at least a portion of data stored in the volume B Vol B may be also lost. In this case, it may be impossible to use data stored in the storage system.

According to embodiments, when a volume manager allocates a physical disk to a volume, the volume manager may perform an allocation operation based on RAID information from the outside and/or disk information in the storage system, without executing the RAID algorithm therein. Accordingly, it may be possible to prevent an issue such as a decrease in the stability of data.

Figure 7:
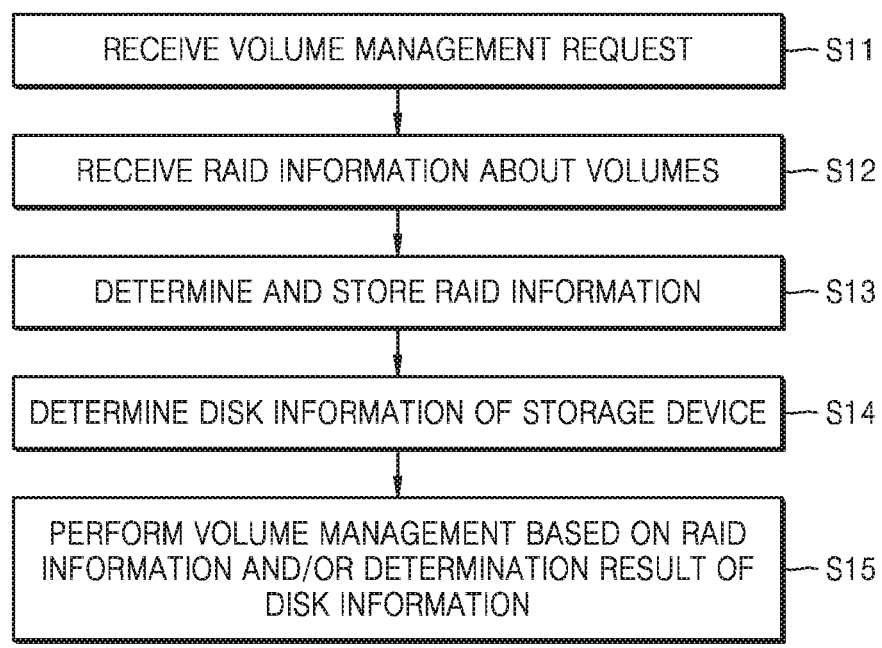
FIG. 7 is a flowchart of an example of a method of managing volumes of a storage system.

FIG. 7 is a flowchart illustrating an embodiment of a method of managing volumes of a storage system.

Referring to FIG. 7, the storage system may receive a management request for creating and changing volumes from a host (S11) and may receive RAID information about one or more volumes that are targets for the management request (S12). For example, in the case where the host combines at least two volumes into one RAID, information about combination of volumes into the RAID may be received as the RAID information. For example, in the case where the host provides a creation request for two volumes (e.g., a first volume and a second volume) constituting RAID 1, information, which indicates that the first volume and the second volume are correlated to each other with regard to a data access, may be included in the RAID information. Also, information (e.g., RAID information) about a level of RAID composed of the first and second volumes may be further included in the RAID information. The storage system may determine the received RAID information and may manage the RAID information as correlation information between volumes after storing the RAID information in the storage system (S13).

Meanwhile, the volume management operation may include an operation of allocating a storage space to each volume, and the allocation operation may be performed on the basis of the RAID information provided from the outside. According to an embodiment, the allocation operation may be performed further with reference to information of disks included in the storage device. In this case, the storage system may determine disk information therein (S14) and may perform the volume management operation further based on the result of determining the disk information. That is, the storage system may manage an operation of allocating a storage space to each volume based on the result of determining at least one of the above-described RAID information and disk information.

According to the above-described volume management operation, a storage space may be allocated such that volumes constituting one RAID do not share the same physical disk as each other. In the first volume and the second volume constituting RAID 1, for example, if a storage space of one of disks is allocated to the first volume, a storage space of at least one of the remaining disks may be allocated to the second volume.

Meanwhile, as a modified embodiment, a system may be implemented such that if the host provides the volume management request, an administrator system, which operates the storage system, receives the volume management request, generates correlation information (or RAID information) based on the result of analyzing the volume management request, and provides the correlation information to the volume manager of the storage system.

Figure 8A:
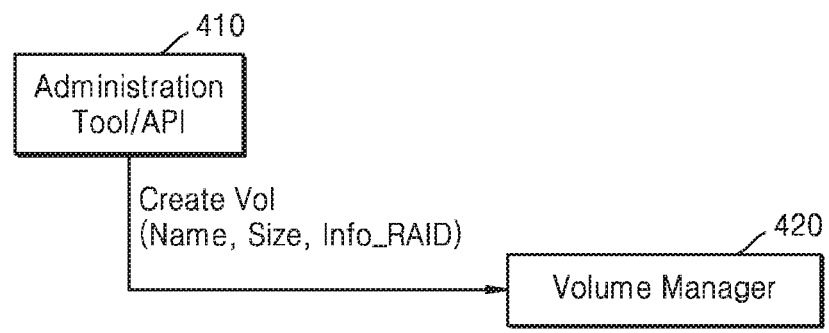
FIGS. 8A and 8B are block diagrams illustrating examples in which a storage system receives RAID information.
Figure 8B:
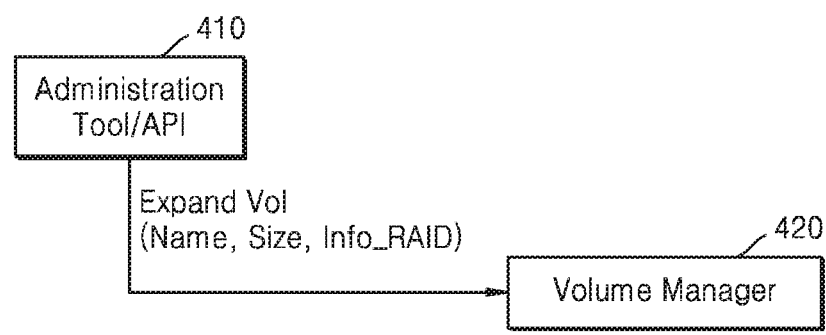

FIGS. 8A and 8B are block diagrams illustrating examples in which a storage system receives RAID information.

Referring to FIG. 8A, the storage system may include a volume manager 420, and the RAID information Info_RAID may be provided to volume manager 420 upon creation of volumes. The RAID information may be generated by an administration tool/API 410, and administration tool/API 410 may be installed on a host or on an administrator system operating the storage system.

Information about the creation of volumes may be provided to volume manager 420 from administration tool/API 410 installed on the host or administrator system. For example, various parameters such as a name and a size of a volume to be created may be provided to volume manager 420. Also, as additional information, a parameter indicating availability zone assignment information, whether to perform encryption, a kind (SSD or HDD) of a disk to be stored, or provisioning performance information may be provided to volume manager 420 together with the various parameters. In addition, according to an embodiment, information of volumes (or a volume group), of which defects are isolated from each other, may be provided to volume manager 420. As described above, the RAID information Info_RAID corresponding to volumes may be provided to volume manager 420 together with the information of the volumes. Information of the volumes (or a volume group), of which defects are isolated from each other, may be expressed in the form of a volume list. Alternatively, in the case where a group name of previously grouped volumes is present, the group name may be assigned.

The above-described pieces of information may be provided by administration tool/API 410 to volume manager 420 in various forms. For example, the pieces of information may be transmitted through a command-line interface (CLI), a GUI, an API, etc. Besides, the pieces of information may be transmitted even through a storage protocol command.

Meanwhile, the term "volume" may be variously changed according to a system configuration. For example, in the case where disks of a storage system include nonvolatile memory express (NVMe) SSDs, the above-described volume manager may be referred to as a "name space manager". Alternatively, in the case where an operating system operating or using the storage system corresponds to the WINDOWS® operating system, the above-described volume manager may be referred to as a "partition manager". As another example, in the case where the SCSI is applied to a system, the above-described volume manager may be referred to as a "logical unit (LU) manager". The volume, which is the term mentioned in the above-described embodiment, may be used as a general term that is collectively referring to the name space, partition, and LU.

Meanwhile, in the case where a volume is changed (or expanded or reduced), the RAID information may be provided to the volume manager. An example, in which the RAID information is provided to the volume manager upon expansion of volumes, is illustrated in FIG. 8B.

Referring to FIG. 8B, a variety of information for volume management may be provided to volume manager 420 through administration tool/API 410 upon expansion of volumes. For example, information, such as a name or a changed size of a volume to be expanded, may be provided to volume manager 420. Furthermore, a RAID level corresponding to a volume may be changed in the process of changing a characteristic of the volume. As the RAID information Info_RAID is provided to volume manager 420, a table, in which correlation information (or RAID information) between volumes is stored, may be updated.

For example, while a first volume is used without applying the RAID algorithm, the RAID information Info_RAID corresponding to the first volume may be provided to volume manager 420 when a request for change of a characteristic of the first volume is received. In this case, information of another volume (e.g., a second volume) associated with the first volume may be provided to volume manager 420. Volume manager 420 may perform management, such as allocation of a storage space, such that defects of the first volume and defects of the second volume are isolated from each other. In this case, data previously recorded in a storage space corresponding to the first volume may be moved (or copied) to a storage space of a newly created second volume to maintain a defect isolation state.

Alternatively, when a volume change, such as expansion or reduction, is requested, a variety of information associated with the RAID may be provided to volume manager 420 together with the request. For example, the RAID information Info_RAID may be provided to volume manager 420 such that a first volume and a second volume, which are previously created without correlation with each other, constitute RAID 1. Alternatively, information for releasing the correlation between the first and second volumes constituting RAID 1 may be provided on the first and second volumes constituting RAID 1. In a volume management process, volume manager 420 may perform the volume management operation based on the received RAID information Info_RAID.

Meanwhile, in the case where the RAID information Info_RAID is not provided to volume manager 420 during an operation of managing volumes, for example, expanding or reducing volumes, previously used correlation information (or correlation information used upon the creation of volumes) may be maintained. For example, if capacity expansion is requested on a first volume of the first and second volumes constituting RAID 1, the storage system may expand a capacity of the first volume in response to the request of the host. In this case, whether the first volume and the second volume constitute RAID 1 may be determined on the basis of correlation information stored in the storage system. Also, the volume management operation may be performed such that a capacity of the second volume is also expanded.

Figure 9:
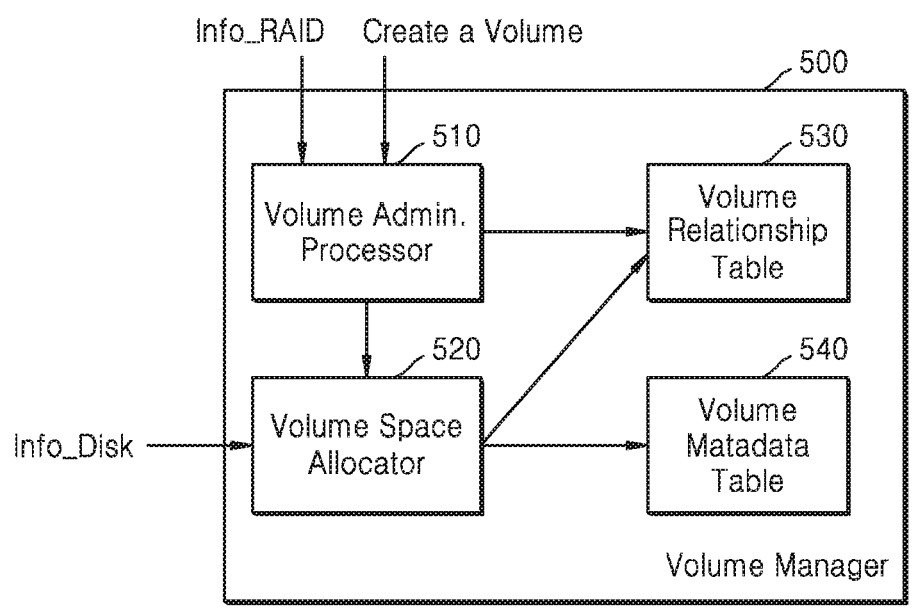
FIG. 9 is a block diagram illustrating implementation of a volume manager included a storage system.
Figure 10A:
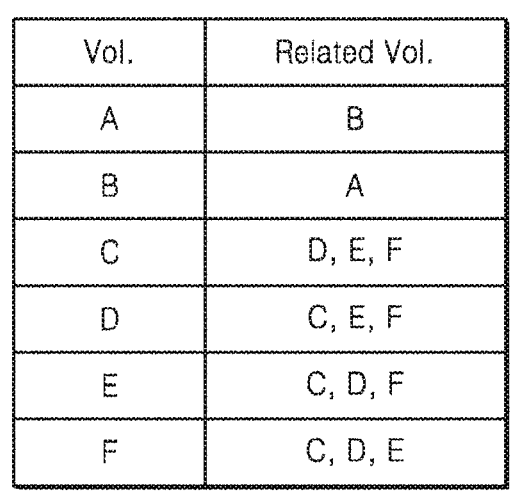

FIG. 9 is a block diagram illustrating implementation of a volume manager included in a storage system. FIGS. 10A and 10B are views illustrating implementation of a volume relationship table of FIG. 9. An example of a volume management operation according to a volume creation request is illustrated in FIG. 9.

Referring to FIGS. 9, 10A, and 10B, a volume manager 500 may include a volume administration processor 510, a volume space allocator 520, a volume relationship table 530, and a volume metadata table 540. Elements are illustrated in FIG. 9 as operations of volume manager 500 made into blocks for respective functions. That is, volume manager 500 may practically execute function blocks illustrated in FIG. 9 in software. To this end, volume administration processor 510 may also execute software (or a program) stored in a memory that is provided inside or outside of volume manager 500. In particular, for example, a processing unit (e.g., processing unit 310) may execute instructions stored in memory to implement the functions of volume administration processor 510 and volume space allocator 520.

First, volume manager 500 may include volume relationship table 530, and if the RAID information Info_RAID is provided from the outside, volume manager 500 may store or update the RAID information Info_RAID in volume relationship table 530. Volume administration processor 510 may perform a volume creation operation in response to a volume creation request and may store created volumes and the RAID information Info_RAID corresponding to the created volumes in volume relationship table 530.

For example, as illustrated in FIG. 10A, when there is a need to isolate a defect between a volume "A" and a volume "B," as the volume "A" and the volume "B" constitute RAID 1, information that indicates that the volume "A" and the volume "B" are correlated to each other may be stored in volume relationship table 530 under control of volume administration processor 510. When it is determined according to the RAID information Info_RAID that a volume "C," volume "D," volume "E," and volume "F" constitute a RAID 5, information that indicates that the volumes "C," "D," "E," and "F" are correlated to each other may be stored in volume relationship table 530 under control of volume administration processor 510. Meanwhile, as illustrated in FIG. 10B, information indicating a RAID level applied to volumes correlated to each other may be stored in volume relationship table 530 together with correlation information between the volumes.

Volume space allocator 520 may allocate a storage space of a physical disk to each volume with reference to volume relationship table 530. Also, volume space allocator 520 may store or update the allocation result in volume metadata table 540. According to an embodiment, volume space allocator 520 may perform an allocation operation based on information Info_Disk of disks included in the storage system. Like or as in the above-described embodiment, the disk information Info_Disk may be stored in volume manager 500 or may be provided to volume space allocator 520 after being stored outside of volume manager 500.

Volume space allocator 520 may determine the relationship between volumes with reference to volume relationship table 530. For example, in the case where the volume "A" and the volume "B" constitute RAID 1, volume space allocator 520 may allocate storage spaces of different physical disks to the volumes "A" and "B", respectively. For example, in the case where a storage space of a first disk among a plurality of disks included in the storage system is allocated to the volume "A", an allocation operation may be performed such that a storage space of at least one disk among the remaining disks is allocated to the volume "B". The disk allocation result may be stored in the volume metadata table 540.

Meanwhile, FIGS. 10A and 10B illustrate an example of correlation information between volumes stored in the storage system. However, embodiments are not limited thereto. For example, a storage system according to some embodiments may further store any other information in addition to the above-described information. For example, if a variety of information (e.g., a name, a capacity, and whether to perform encryption) included in a request for creation or change of volumes or an operating characteristic (e.g., an I/O speed) of each volume may be further stored in volume relationship table 530.

An example of volume metadata and disk status information mentioned in the above-described embodiment will be described below. FIGS. 11A and 11B are views illustrating an example of table information including volume metadata and disk status information.

Referring to FIG. 11A, a volume metadata table may include information about storage spaces that are allocated to volumes. For example, a disk, of which a storage space is allocated to the volume "A", may correspond to the first SSD "SSD 1", and address information of the first SSD "SSD 1" corresponding to the storage space may be included in the volume metadata table. The address information may include an address from which the storage space starts, and an address at which the storage space ends. Furthermore, information about a capacity of the storage space allocated to the volume "A" and information about a capacity of a free space may be further included in the volume metadata table.

Meanwhile, as the volume "A" and the volume "B" constitute RAID 1, storage spaces of different disks may be respectively allocated to the volumes "A" and "B". For example, disks of which a storage space is allocated to the volume "B" may correspond to the second SSD "SSD 2" and the third SSD "SSD 3," and a capacity of the storage space allocated to the volume "B" may be the same as that of the volume "A". Also, since data stored in the volume "A" is mirrored to the volume "B," capacity information of a free space of the volume "B" may be the same as that of the volume "A".

In contrast, since the volume "C" does not constitute one RAID with the volume "A" (or it does not have correlation information with the volume "A"), there is no need to isolate a defect between the volume "A" and the volume "C". As such, a disk, of which a storage space is allocated to the volume "C" may correspond to the first SSD "SSD 1" and a capacity of a storage space allocated to the volume "C" may be variously set according to a request of a host.

Meanwhile, referring to FIG. 11B, volume space allocator 520 may perform an allocation operation with reference to a table of FIG. 11B including disk status information.

For example, in the case where storage spaces are respectively allocated to the volumes "A" and "B" constituting RAID 1, even though data in any one of the volumes "A" and "B" is lost, there is a need to stably retain data of the remaining volume. As such, volume space allocator 520 may allocate a storage space to each of the volumes "A" and "B" with reference to the table including the disk status information.

The disk status information may include various kinds of information. For example, in the case where a disk is implemented with an SSD including flash memories, degradation of the disk may vary according to the number of program/erase cycles of each flash memory. For example, as the number of program/erase cycles increases, the degradation of the disk may become more severe, thereby causing an increase in the probability that a defect occurs at the disk. To indicate a degradation level for each disk, the disk status information may include information about a write frequency W_Num, an erase frequency E_Num, and a BER. Also, in the case where a defect occurs at a disk, the disk status information may further include information Defect, which indicates whether a defect occurs, for each disk.

According to an embodiment, an operation of allocating a storage space further with reference to the disk status information may be performed according to various ways. For example, it may be possible to prevent allocation of a disk in such a way that the probability that defects simultaneously occur at the volume "A" and the volume "B" constituting RAID 1 is high. Accordingly, the stability of data may be improved by making the probability of occurrence of a defect low (e.g., less than a defined threshold, or less than average) in at least one of volumes constituting RAID 1.

Figure 12A:
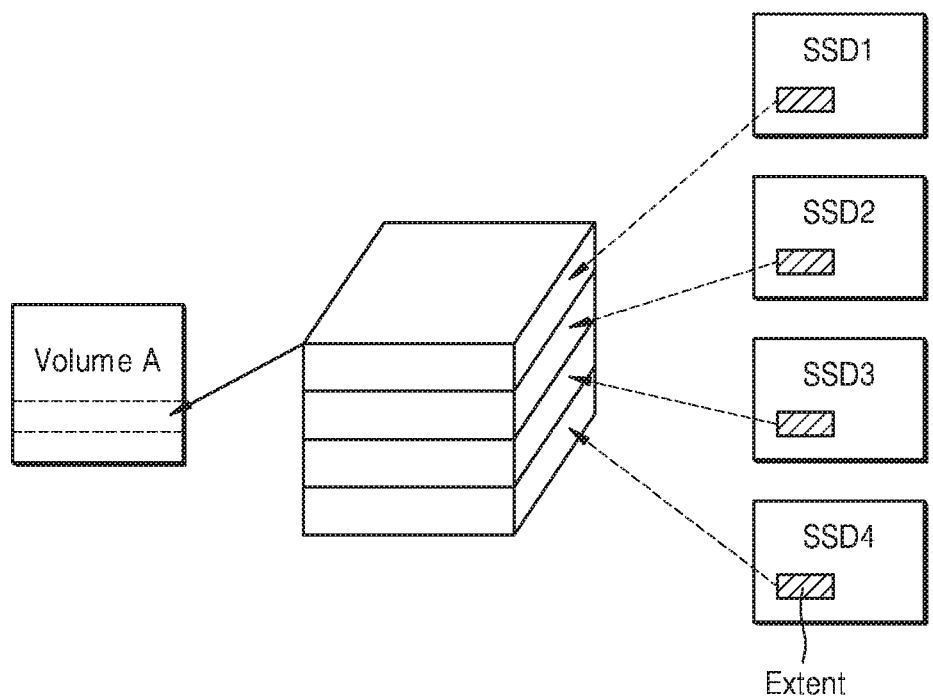
FIGS. 12A and 12B are views illustrating an example of applying thin provisioning to an embodiment of a storage system.
Figure 12B:
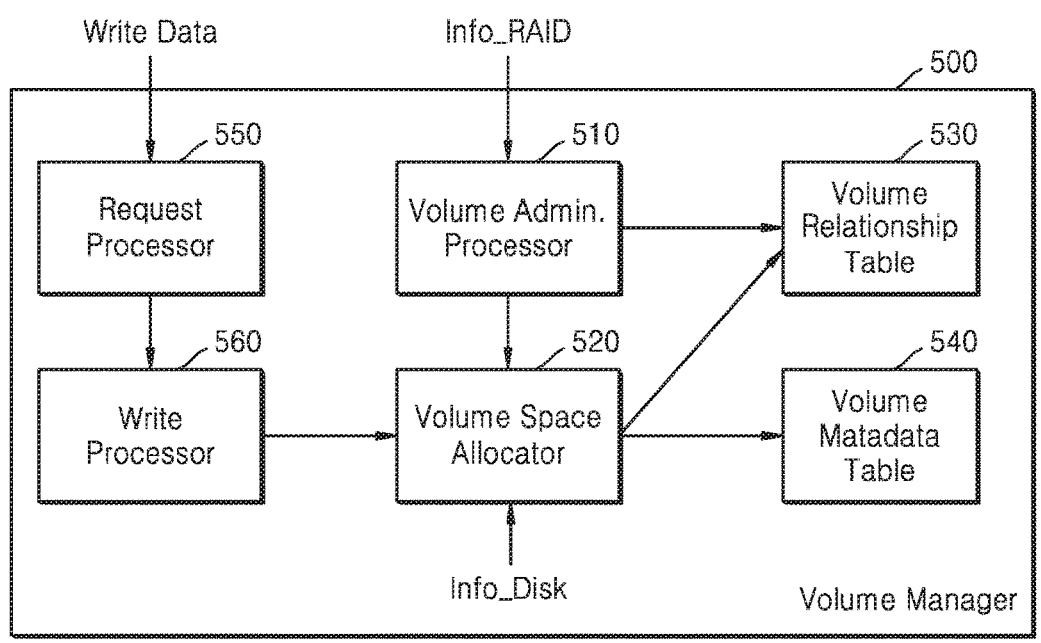

FIGS. 12A and 12B are views illustrating an example in which thin provisioning is applied to an embodiment of a storage system.

Referring to FIG. 12A, as the thin provisioning is applied to the storage system, allocation of a storage space to a volume may be performed at a data write request. If a write request is received from a host, a storage unit (e.g., Extent) of a size may be provided from each of one or more disks (e.g., SSD 1 to SSD 4), and the Extents provided from the disks (e.g., SSD 1 to SSD 4) may constitute one chunk. That is, a storage space may be dynamically allocated in units of chunks whenever the data write request is received from the host.

Referring to FIG. 12B, the allocation operation according to embodiments may be performed on a storage system to which the thin provisioning is applied. Referring to FIG. 12B, volume manager 500 may include volume administration processor 510, volume space allocator 520, volume relationship table 530, and volume metadata table 540. Also, volume manager 500 may further include a request processor 550 and a write processor 560.

As described in the above embodiment, functions of elements illustrated in FIG. 12B may be implemented by software. To this end, volume administration processor 510, request processor 550, and write processor 560 may perform the above-described functions by respectively executing pieces of software stored in the storage system. Furthermore, it doesn't matter if volume administration processor 510, request processor 550, and write processor 560 are respectively implemented with separate processors (or separate cores). Alternatively, volume administration processor 510, request processor 550, and write processor 560 may be implemented with the same processor. In the case where volume administration processor 510, request processor 550, and write processor 560 are implemented with the same processor, processors 510, 550, and 560 may be only elements that are operatively separated from each other. In this case, processors 510, 550, and 560 may be depicted as one processor.

In FIG. 12B, the elements that are the same as the elements of the above-described embodiment may perform the same or similar operations, and a description thereof will not be repeated here.

If a volume creation request is received according to the thin provisioning technique, a volume may be created without practically allocating a physical storage space, and the RAID information Info_RAID received from the outside may be stored in the volume relationship table 530.

Meanwhile, request processor 550 may analyze a request from a host. If the request corresponds to a write request, request processor 550 may provide the write request to write processor 560. Write processor 560 may control volume space allocator 520 before controlling a data write operation, and volume space allocator 520 may perform an operation of allocating a storage space to a volume with reference to volume relationship table 530.

As in the above-described embodiment, volume space allocator 520 may perform an operation of allocating a storage space to a volume further with reference to the disk information Info_Disk and may update the allocation result in volume metadata table 540. If an address (e.g., a combination of a disk and a logical address) according to the allocation result is provided to write processor 560, write processor 560 may write data at a location corresponding to the address.

As described above, in the case where data is written according to the thin provisioning technique, the allocation operation may be performed on the basis of information stored in volume relationship table 530 when the write request is received. Accordingly, it may be possible to prevent a storage space of the same physical disk from being allocated to volumes constituting one RAID.

Figure 13A:
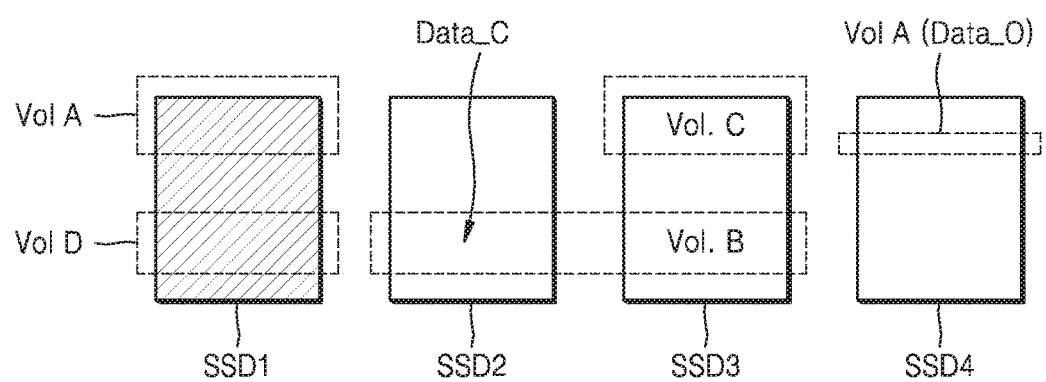

FIGS. 13A and 13B are a block diagram and a table that illustrate an example in which storage spaces are allocated to volumes. In FIGS. 13A and 13B, it is assumed that a storage space is allocated to a volume at a data write request based on the thin provisioning technique.

Referring to FIG. 13A, a plurality of disks SSD 1 to SSD 4 may be provided as a pool for creating volumes, and an example, in which the volume "A" and the volume "B" constitute RAID 1, is illustrated. According to the above-described embodiment, to isolate a defect between volumes constituting RAID 1 upon allocation of a storage space to a volume, storage spaces of different physical disks may be respectively allocated to the volumes "A" and "B." For example, a storage space of the first SSD "SSD 1" may be allocated to the volume "A," and storage spaces of the second SSD "SSD 2" and the third SSD "SSD 3" may be allocated to the volume "B". In addition, it is illustrated an example in which a storage space of the third SSD "SSD 3" is allocated to the volume "C," which is not associated with RAID 1, and a storage space of the first SSD "SSD 1" is allocated to the volume "D" that is not associated with RAID 1.

When data is written in volumes constituting RAID 1, data written in the volume "A" may be also written in the volume "B". Storage spaces of the disks SSD 1 to SSD 4 may be allocated to different volumes based on usage statuses of the disks SSD 1 to SSD 4. In this case, the event that an additional storage space is present in the second SSD "SSD 2" and the third SSD "SSD 3" and is absent in the first SSD "SSD 1" may occur when storage spaces are allocated to volumes in response to a write request.

In the above-described embodiment, a volume space allocator may determine usage statuses of disks with reference to a volume metadata table and may allocate a storage space such that data to be written in the first SSD "SSD 1," in which an additional storage space is absent, is written in another disk. For example, when a write request is received, a storage space of the fourth SSD "SSD 4" may be allocated to the volume "A," and data may be written in the allocated storage space of the fourth SSD "SSD 4." Data Data_O corresponding to the write request may be written in the storage space of the fourth SSD "SSD 4" allocated to the volume "A," and copy data (or mirror data) Data_C of the data Data_O may be written in a storage space of the second SSD "SSD 2" and/or the third SSD "SSD 3" allocated to the volume "B."

According to the above-described storage space allocation and write operations, the volume metadata table illustrated in FIG. 13B may be updated. For example, information of storage spaces allocated to existing volumes may be included in the volume metadata table. Information about a storage space of the first SSD "SSD 1" allocated to the volume "A" may be stored according to the above-described example, and information about a storage space of the second SSD "SSD 2" and the third SSD "SSD 3" allocated to the volume "B" may be also stored. Furthermore, information about a storage space of the fourth SSD "SSD 4" newly allocated to the volume "A" may be updated in the volume metadata table.

As described above, correlation information between volumes may be determined upon writing of data in the thin provisioning way. Even though a storage space of a physical disk different from an existing disk is allocated to any one volume (e.g., the volume "A"), a storage space may be allocated such that a defect is isolated from another volume (e.g., the volume "B").

Figure 14:
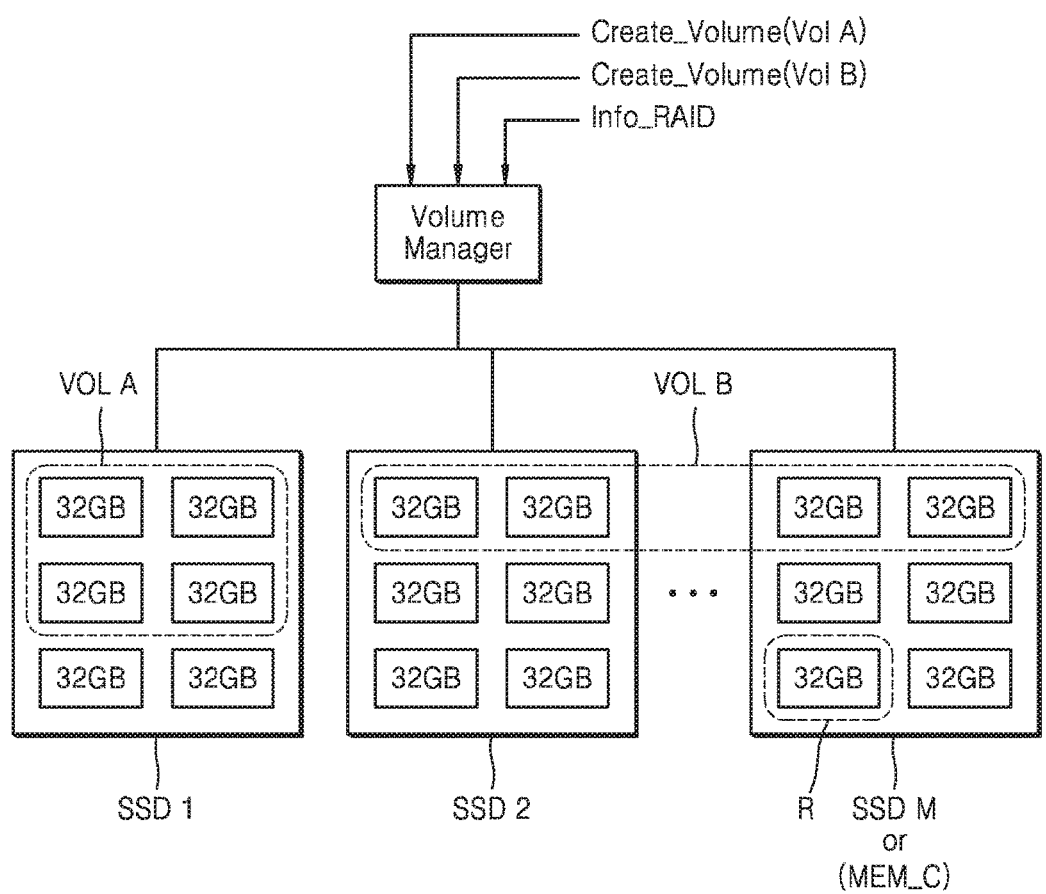
FIG. 14 is a view illustrating an example of allocating storage spaces to a plurality of volumes constituting one RAID.

FIG. 14 is a view illustrating an example in which storage spaces are allocated to a plurality of volumes constituting one RAID according to embodiments.

Referring to FIG. 14, a volume creation request may be provided from a host to a volume manager, and the RAID information Info_RAID corresponding to a volume to be created may be provided to the volume manager. As a creation request for two volumes Vol A and Vol B constituting RAID 1 is provided, the volume manager may store (or update) the RAID information Info_RAID having correlation information between the volumes Vol A and Vol B in a volume relationship table. For example, information indicating that the volumes Vol A and Vol B constitute RAID 1 may be stored in the volume relationship table.

Also, an operation of allocating storage spaces to the created volumes Vol A and Vol B may be performed. Storage spaces of a plurality of disks SSD 1 to SSD M included in a storage system may be allocated to volumes Vol A and Vol B, and an operation of allocating a storage space may be performed according to embodiments such that a defect is isolated between the volumes Vol A and Vol B constituting RAID 1. For example, a portion of a storage space of the first SSD "SSD 1" may be allocated to a first volume Vol A, and a portion of a storage space of the second SSD "SSD 2" and the M-th SSD "SSD M" may be allocated to a second volume Vol B. Since storage spaces of different physical disks are respectively allocated to the first and second volumes Vol A and Vol B, the probability that data of the first and second volumes Vol A and Vol B constituting RAID 1 are simultaneously lost may be reduced.

Meanwhile, according to an embodiment, an operation of physically isolating storage media from each other may be variously performed. For example, as illustrated in FIG. 14, in the case where one disk SSD includes a plurality of memory chips, an element "R" illustrated in FIG. 14 may correspond to a memory chip.

Alternatively, in FIG. 14, "M" storage media may be defined as corresponding to memory chips instead of SSDs. For example, the storage system illustrated in FIG. 14 may be defined as including "M" memory chips MEM_C. In this case, the element "R" illustrated in FIG. 14 may correspond to a storage space of an area included in a memory chip MEM_C. Also, in this case, an operation of physically isolating storage media may be defined as allocating storage spaces of different physical memory chips.

According to an embodiment, the storage system may be defined in various forms. For example, one SSD illustrated in FIG. 14 may be defined as a storage system. In this case, one SSD may include one or more memory chips as a storage medium. Also, a volume manager, which manages volumes and allocates storage spaces as described in the above embodiments, may be implemented in each SSD. That is, the volume manager may be implemented in each SSD and each SSD may be defined as a storage system. In this case, when a volume management operation is performed in each SSD, storage spaces of different physical memory chips may be allocated to two or more volumes constituting one RAID.

Figure 15:
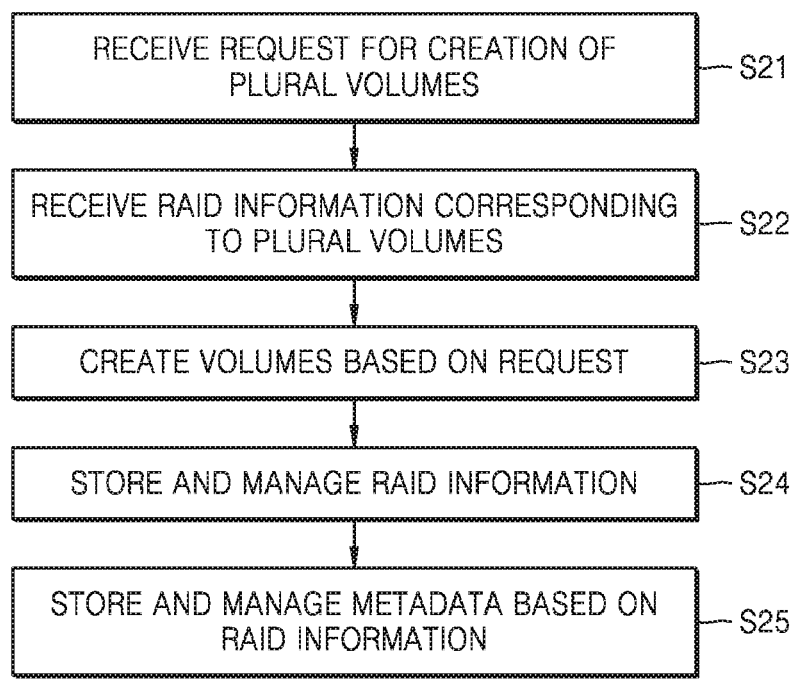
FIGS. 15, 16 and 17 are flowcharts illustrating examples of embodiments of various volume management operations.
Figure 16:
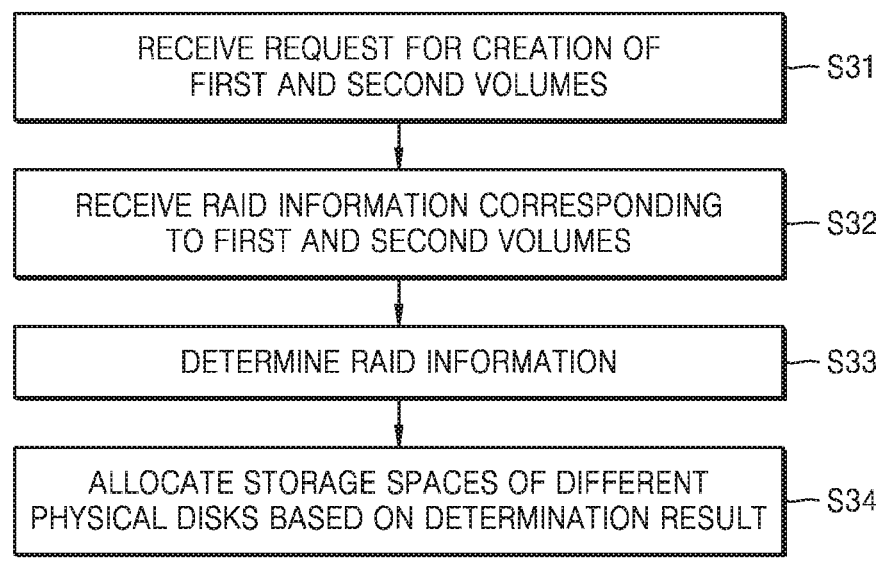
Figure 17:
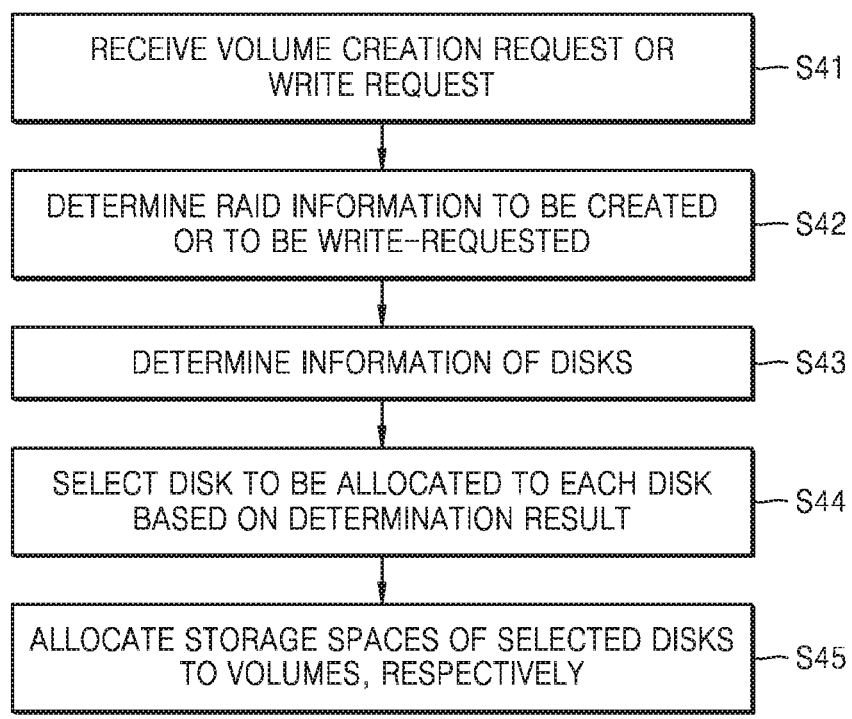

FIGS. 15 to 17 are flowcharts illustrating examples of embodiments of various volume management operations. An operation, in which a storage system manages information, is exemplified in FIG. 15, and an example, in which a storage space is allocated to a volume upon creation of the volume, is exemplified in FIG. 16. An example, in which a storage space is allocated to a volume based on information of disks, is exemplified in FIG. 17.

Referring to FIG. 15, a request for creation of a plurality of volumes may be received from a host (or an administrator system of a storage system) (S210). The host may combine the plurality of volumes into one RAID, and RAID information corresponding to the volumes may be received from the host (S22). As in the above-described embodiment, the RAID information may be generated by the host or a tool or API of the administrator system.

The storage system may create the volumes in response to the request of the host (S23) and may store and manage the RAID information from the host (S24). For example, as a request for creation of a volume "A" and a volume "B" is received and information indicating that the volume "A" and the volume "B" constitute RAID 1 is received, information about a level of RAID composed of the volume "A" and the volume "B" is stored and managed together with correlation information indicating that the volume "A" and the volume "B" are correlated to each other.

Also, a storage space may be allocated to each volume created according to the volume creation request, or a storage space may be allocated to a volume whenever a write request is received. The storage space may be allocated on the basis of the RAID information. As the allocation operation is performed according to the result of referring to the RAID information, the result may be stored and managed as volume metadata (S25). According to the above-described embodiment, since the allocation operation is performed on the basis of the RAID information, a storage space may be allocated such that defects of volumes constituting the same RAID are isolated from each other.

Referring to FIG. 16, the storage system may receive a request for creation of first and second volumes from the host (S31). The host may designate volumes constituting one RAID by internally performing the RAID algorithm and may provide the designation result to the storage system. As a path for transmitting the RAID information is established between the host and the storage system, the storage system may receive the RAID information corresponding to the first and second volumes (S32).

The storage system may determine the RAID information (S33) and may determine whether the first and second volumes are correlated to each other in a RAID function, based on the determination result. Furthermore, a level of the RAID composed of the first and second volumes may be determined. Whether to isolate a defect between the first and second volumes may be determined on the basis of the determination result; if there is a need to isolate a defect, storage spaces of different physical disks may be respectively allocated to the first and second volumes.

Referring to FIG. 17, the storage system may receive the volume creation request or the write request (S41) and may determine RAID information corresponding to a volume to be created or write-requested (S42). For example, the RAID information from the host may be determined at the volume creation request. At the write request, the RAID information may be determined on the basis of a correlation information table that is managed after being stored in the storage system.

Information of a plurality of disks may be further determined when a storage space is allocated to each volume (S43). As the information of the disks, status information indicating a life cycle or defect probability of each disk may be determined in addition to basic information such as the number of disks, IDs of the disks, and kinds of the disks. As described above, a life cycle of a disk implemented with the SSD or HDD may become shorter as an erase frequency or a write frequency increases. The bit error rate (BER) may increase as degradation of stored data progresses.

Disks to be respectively allocated to volumes may be selected according to the result of determining the status information (S44). For example, in the case where storage spaces are respectively allocated to the volume "A" and the volume "B" constituting RAID 1, there is a need to allocate a disk, in which the probability that a defect occurs is low (e.g., less than a threshold, or less than the average of all of the disks), to at least one of the volume "A" and the volume "B" to stably store data in RAID 1. As such, a disk of relatively high performance (a disk of which a life cycle is relatively long (e.g., greater than a threshold, or greater than the average of all of the disks) or in which the probability that a defect occurs is relatively low (e.g., less than a threshold, or less than the average of all of the disks)) may be selected on the basis of the result of determining status information of the disks so as to correspond at least one of the volume "A" and the volume "B."

If disks to be respectively allocated to the volumes "A" and "B" are selected, storage spaces of the selected disks may be respectively allocated to the volumes "A" and "B" (S45). As a modified embodiment, each disk may include a plurality of storage media (e.g., memory chips), and an operation of selecting disks to be allocated to volumes based on the status information may be performed with respect to the storage medium. That is, in the case where a plurality of storage media are included in the same disk, even though the same disk is selected for the volume "A" and the volume "B," storage spaces of different storage media may be respectively allocated to the volumes "A" and "B." As another embodiment, in a memory chip, an allocation operation may be performed in units of storage areas each having a size.

Figure 18A:
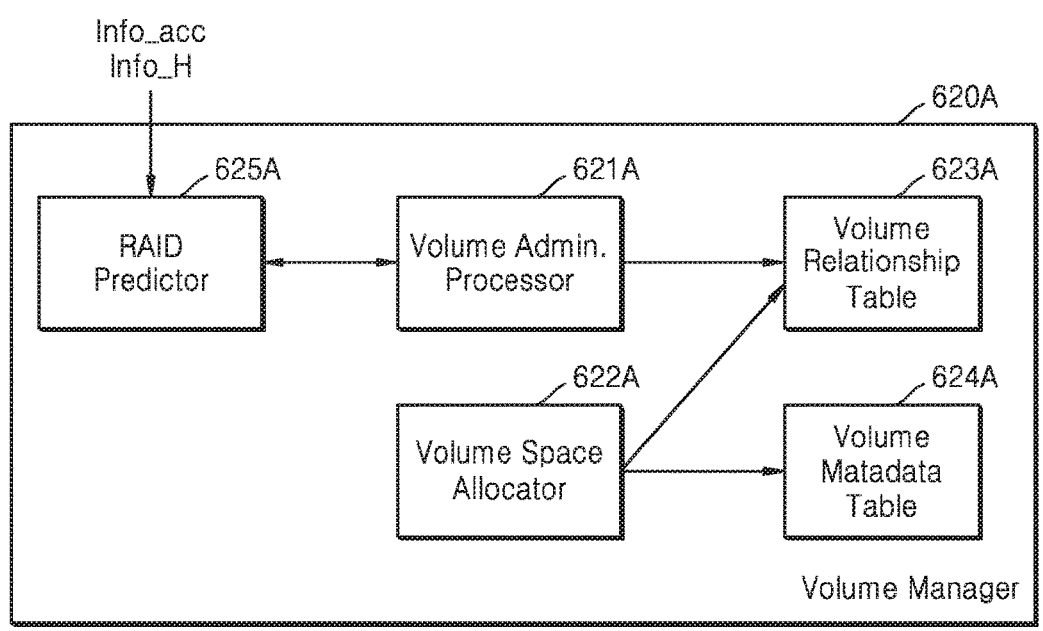
FIGS. 18A, 18B, and 18C are block diagrams illustrating a modified embodiment of a storage system.
Figure 18B:
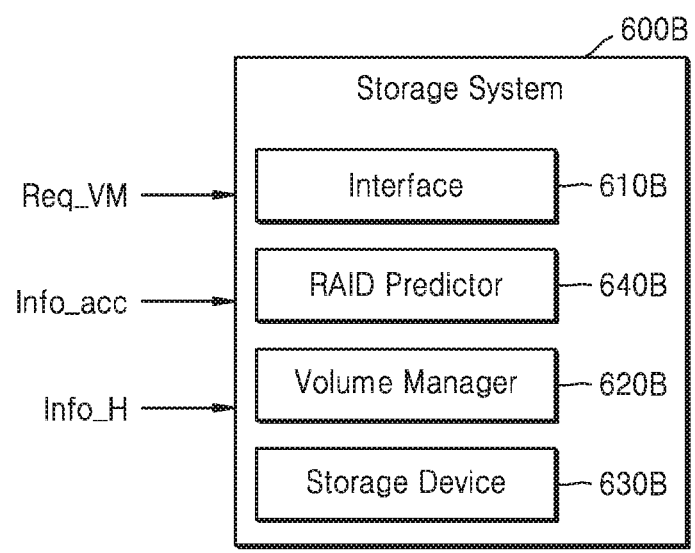
Figure 18C:
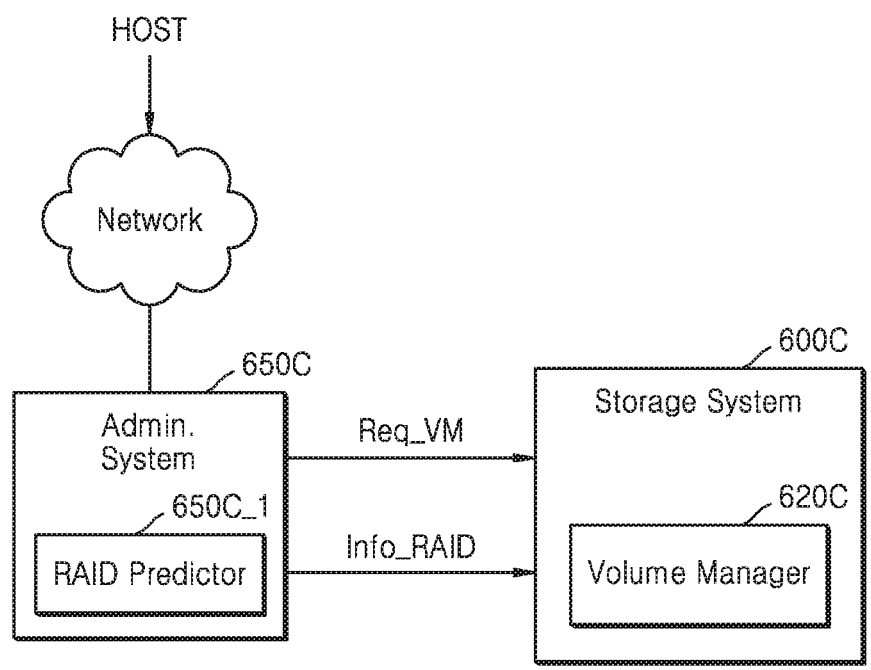

FIGS. 18A, 18B, and 18C are block diagrams illustrating a modified embodiment of a storage system.

Referring to FIG. 18A, a volume manager 620A of the storage system may include a volume administration processor 621A, a volume space allocator 622A, a volume relationship table 623A, and a volume metadata table 624A. According to an embodiment, volume manager 620A may further include a RAID predictor 625A that predicts a RAID level (or RAID information) to be applied to volumes in the storage system without RAID information being directly provided from the outside. Elements are illustrated in FIG. 18A as operations of volume manager 620A are made into blocks for respective functions. That is, volume manager 620A may practically execute function blocks illustrated in FIG. 18A in software. In particular, for example, a processing unit (e.g., processing unit 310) may execute instructions stored in memory to implement the functions of RAID predictor 625A.

On the basis of the internally predicted RAID information, volume administration processor 621A may store or update RAID information of volumes in volume relationship table 623A. When volumes are created or when a data write request is received, volume space allocator 622A may allocate a storage space to each volume based on information stored in volume relationship table 623A. The allocation result may be updated in volume metadata table 624A.

According to an embodiment, volume manager 620A may predict RAID information corresponding to volumes by using a variety of information such as information about a volume management request and information about a host requesting volume management. According to an embodiment, RAID predictor 625A may determine an access pattern of volumes based on information Info_acc associated with data access to the volumes. RAID predictor 625A may determine a level of the stability of data that a host requests, based on information (e.g., Internet Protocol (IP) information Info_H of the host) of the host providing a request for management of volumes.

For example, when a request for creation of one or more volumes or a data write request is received from a specific host, the information Info_H of the host may be provided to volume manager 620A together with the request. RAID predictor 625A may determine the host information Info_H and may predict a RAID level in which the specific host uses volumes. For example, whether the specific host is a host that needs to retain data stably may be determined through a host IP, and the probability that volumes, which will be created according to a request of the specific host or will be write-requested by the specific host, are volumes to be used by a host as RAID 1 may be very high. In this case, RAID predictor 625A may output the prediction result. According to an embodiment, the prediction result, which RAID predictor 625A provides, may correspond to the RAID information from the outside mentioned in the above-described embodiment.

Volume administration processor 621A may perform a volume management operation based on the prediction result. According to an embodiment, RAID information, which is generated on the basis of the prediction result, may be stored in volume relationship table 623A. In the case where storage spaces are respectively allocated to volumes correlated to each other, the storage spaces may be allocated on the basis of the RAID information such that a defect is isolated between the volumes.

As a modified embodiment, RAID predictor 625A may output the prediction result based on access information Info_acc. For example, in the case where a data write or read operation is together (or continuously) requested on a plurality of specific volumes or where data is together written or read in or from the specific volumes continuously during a time period, the probability that the specific volumes are volumes constituting one RAID may be very high. RAID predictor 625A may output the prediction result, which corresponds to the RAID information according to the above-described embodiment, based on the access information Info_acc.

Volume administration processor 621A may perform a volume management operation based on a prediction result that is generated on the basis of the access information Info_acc. For example, RAID information, which is generated according to the prediction result, may be stored in volume relationship table 623A. Storage spaces may be allocated on the basis of the RAID information such that a defect is isolated between volumes.

Since the prediction operation according to the embodiment is performed upon creation of volumes or at a data write request, the prediction operation may be applied to a storage system according to the above-described thin provisioning technique and a storage system according to a technique in which a storage space is allocated to a volume upon creation of volumes. Furthermore, the above-described prediction operation may be performed on the basis of a combination of the host information Info_H and the access information Info_acc, thereby improving the accuracy of prediction.

Meanwhile, as illustrated in FIGS. 18B and 18C, a prediction operation for generating RAID information may be implemented in various other forms.

Referring to FIG. 18B, a storage system 600B may include an interface 610B, a volume manager 620B, and a storage device 630B. According to an embodiment, storage system 600B may further include a RAID predictor 640B. Here, for example, a processing unit separate from volume manager 620B may execute instructions stored in memory to implement the functions of RAID predictor 640B. Although not illustrated in FIG. 18B, volume manager 620B may be implemented according to various of the above-described embodiments.

The prediction operation using the host information Info_H and/or the access information Info_acc may be performed outside of volume manager 620B. For example, the host information Info_H and/or the access information Info_acc may be provided to storage system 600B together with the volume management request Req_VM, and RAID predictor 640B may generate information corresponding to the RAID information of the above-described embodiment by using at least one of the host information Info_H and/or the access information Info_acc. Information according to the prediction result may be provided to volume manager 620B, and volume manager 620B may store and manage the information according to the prediction result. Also, volume manager 620B may allocate a storage space to a volume based on the information according to the prediction result.

Referring to FIG. 18C, a storage system 600C may include a volume manager 620C, and the prediction operation using the host information Info_H and/or the access information Info_acc may be performed outside of storage system 600C. For example, an administrator system 650C, which manages storage system 600C, may receive various volume management requests from a host over a network. Also, administrator system 650C may predict the RAID information Info_RAID based on the host information Info_H and/or the access information Info_acc from the host and may provide the volume management request Req_VM and the RAID information Info_RAID to storage system 600C. As such, administrator system 650C may include a RAID predictor 650C_1 that performs the prediction operation.

Figure 19A:
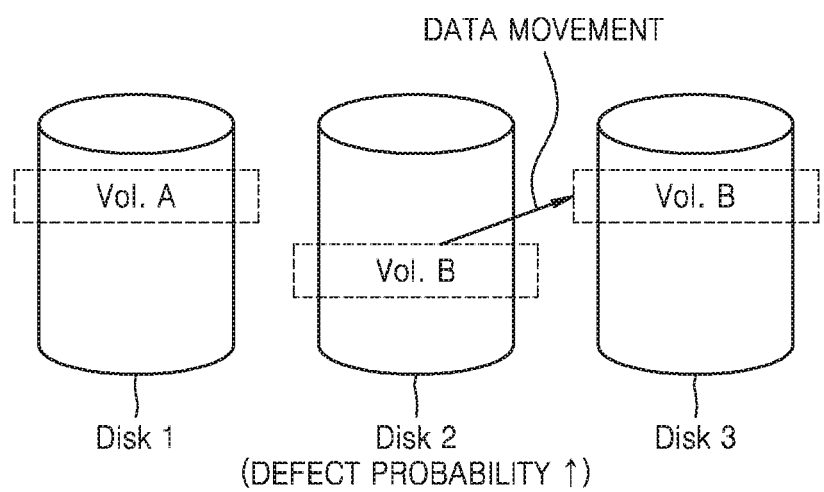
FIGS. 19A, 19B, and 19C are block diagrams illustrating a volume management operation according to a modified embodiment.
Figure 19B:
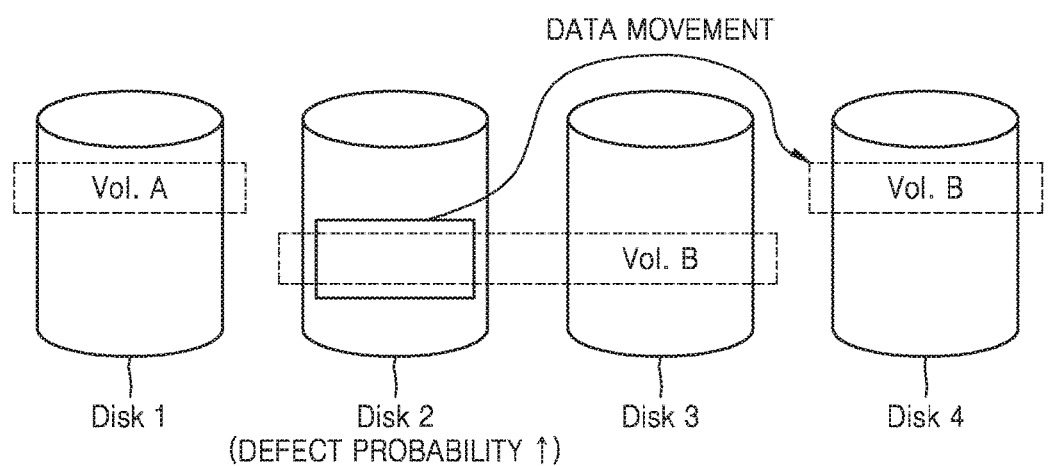
Figure 19C:
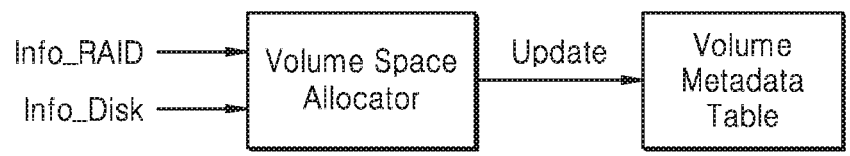

FIGS. 19A, 19B, and 19C are block diagrams illustrating a modified embodiment of a volume management operation. In FIGS. 19A, 19B, and 19C, there is exemplified the case that the first volume Vol A and the second volume Vol B constitute one RAID (e.g., RAID 1) and the probability that a defect occurs at a disk of which a storage space is allocated to the second volume Vol B increases.

Referring to FIG. 19A, a data access operation may be performed as a storage space of the first disk Disk 1 is allocated to the first volume Vol A and a storage space of the second disk Disk 2 is allocated to the second volume Vol B. According to an embodiment, status information of a disk may be determined periodically or randomly, and it may be determined that the probability that a defect occurs at the second disk Disk 2 becomes higher.

According to an embodiment, a storage system may determine the probability that data stored in at least one of volumes constituting one RAID is lost, based on RAID information (or correlation information) and the status information of the disk stored in the storage system. If the probability that a defect occurs at the second disk Disk 2 increases (e.g., if the probability becomes greater than a defined threshold), then data stored in the second disk Disk 2 may be moved to another disk (e.g., a third disk Disk 3) to secure the stability of the data. When a volume metadata table is updated, information indicating that a storage space of the third disk Disk 3 is allocated to the second volume Vol B may be updated.

FIG. 19B exemplifies a case wherein storage spaces of the second and third disks Disk 2 and Disk 3 are allocated to the second volume Vol B and the probability that a defect occurs at the second disk Disk 2 increases (e.g., the probability becomes greater than a defined threshold). In that case, a portion of data stored in the second volume Vol B, that is, data stored in the second disk Disk 2 may be moved to another disk (e.g., a fourth disk Disk 4). When the volume metadata table is updated, information indicating that a storage space of the fourth disk Disk 4 is allocated to the second volume Vol B may be also updated.

FIG. 19C illustrates an example in which the above-described operation is performed. An example, in which a volume space allocator refers to the RAID information Info_RAID and the disk information Info_Disk periodically or randomly and updates the volume metadata table based on a data movement result, is illustrated in FIG. 19C.

Figure 20:
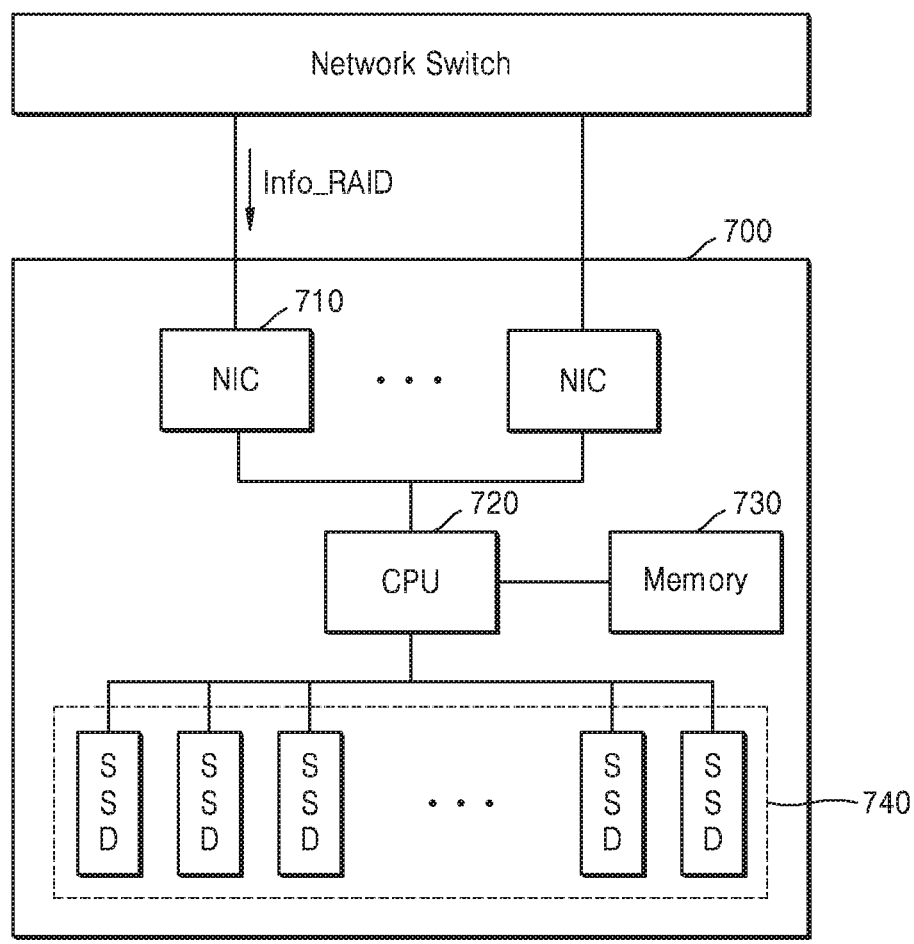
FIGS. 20, 21 and 22 are block diagrams illustrating various computing systems to which the embodiments are applicable.
Figure 21:
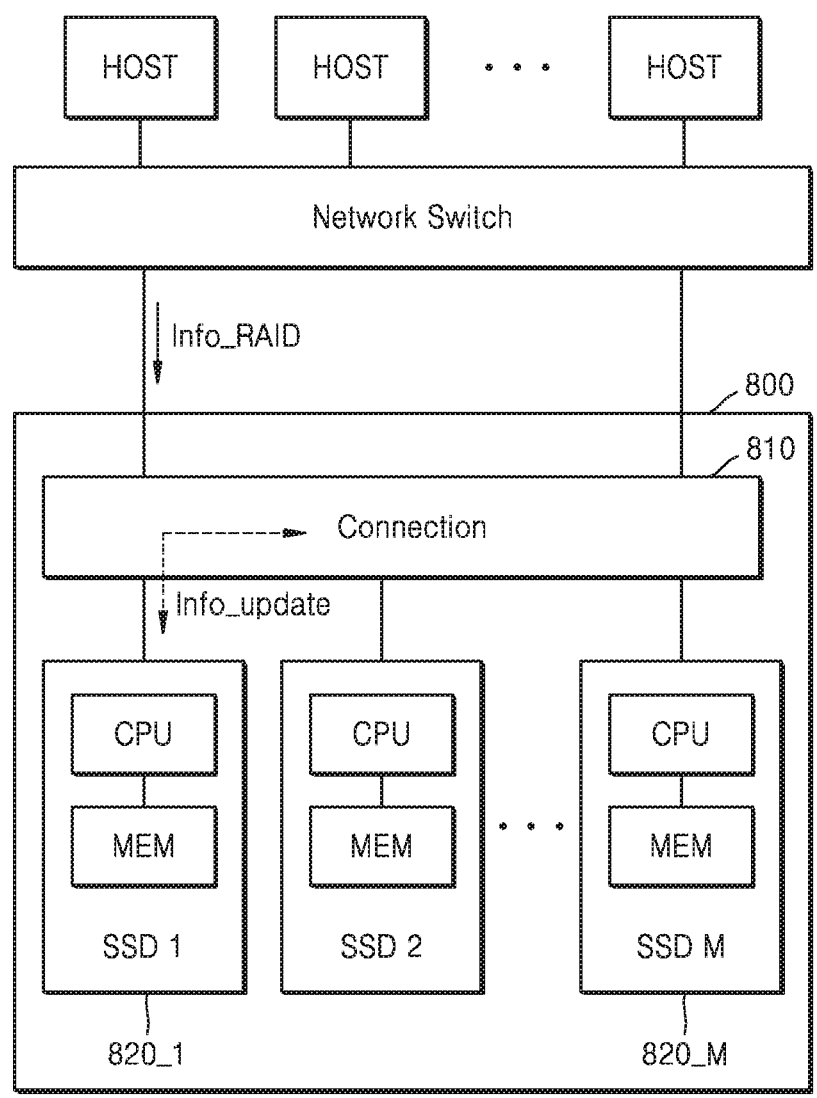
Figure 22:
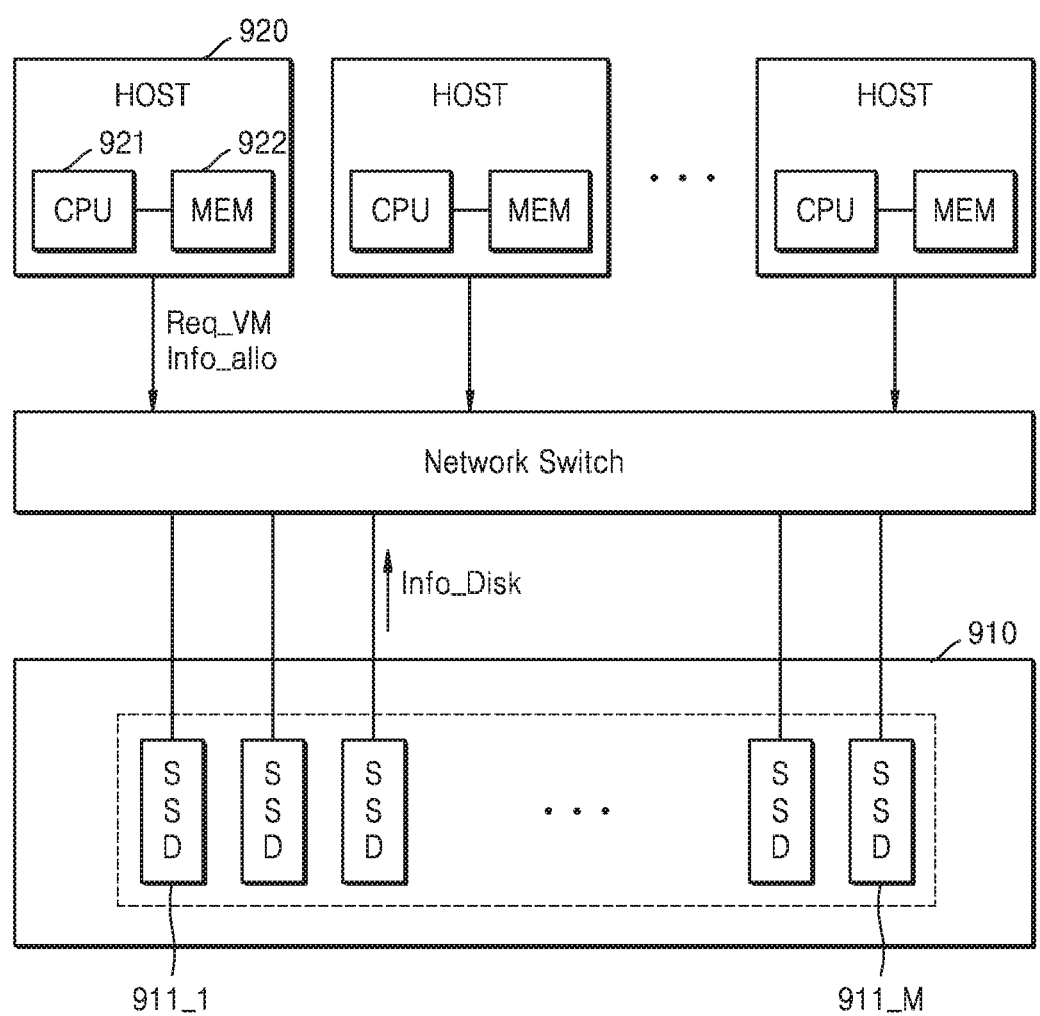

FIGS. 20 to 22 are block diagrams illustrating various computing systems to which embodiments of storage systems as described above are applicable.

Referring to FIG. 20, embodiments of a storage system 700 may provide a storage space for use in a computing system and may include one or more network interface cards 710 communicating with a network switch, a central processing unit (CPU) 720, a memory 730, and a storage device 740. The RAID information Info_RAID from a host may be provided to storage system 700 through the network switch and network interface cards 710.

Software (or a program) for performing the volume management operation according to the above-described embodiments may be stored in memory 730, and CPU 720 may perform the volume management operation according to the above-described embodiments by running the software stored in memory 730.

Referring to FIG. 21, a storage system 800 may include SSDs 820_1 to 820_M as a plurality of disks, and SSDs 820_1 to 820_M may transmit and receive a variety of information through a connector 810 or may forward a request from the host to another SSD. That is, storage system 800 may provide a distributed computing function.

According to an embodiment, each of SSDs 820_1 to 820_M may include a CPU and a memory and may perform the volume management operation according to the above-described embodiments by running software stored in the memory. For example, each of the SSDs 820_1 to 820_M may receive the RAID information Info_RAID according to the above-described embodiments together with the volume management request through the network switch.

Any one SSD may forward the volume management operation to any other SSDs. In this case, the RAID information Info_RAID from the outside may be forwarded together with the volume management operation. Also, as any one SSD performs the volume management operation based on the RAID information Info_RAID, correlation information between volumes or metadata associated with a storage space allocated to a volume may be updated. The update result Info_update of the above-described information may be provided to the other SSDs, and each of the other SSDs may update a table included therein based on the update result Info_update.

As a modified embodiment, an example in which a host performs at least a portion of a management function for isolating a defect between volumes is illustrated in FIG. 22. Hosts 920 may be connected to a storage system 910 through a network switch, and a variety of information Info_Disk of a plurality of disks (e.g., SSDs 911_1 to 911_M) included in storage system 910 may be provided to host 920 through the network switch. The information Info_Disk associated with disks 911_1 to 911_M may include a variety of information, and general information and status information of disks given in the above-described embodiment may be included in the information Info_Disk. Information about available ones (storage spaces) of resources of storage system 910 may be further included in the information Info_Disk.

Any one host 920 is described as an example. Host 920 may include a CPU 921 and a memory 922 and may perform a function of at least a portion of the volume management operation according to the above-described embodiments by executing software stored in memory 922. For example, host 920 may use a RAID function and may provide storage system 910 with information (e.g., allocation information Info_allo) indicating a location of a disk to be allocated to a RAID volume.

For example, host 920 may generate the allocation information Info_allo such that a defect is isolated between a plurality of volumes constituting one RAID. For example, in the case where a first volume and a second volume constitute one RAID, host 920 may provide the allocation information Info_allo, which indicates locations of a storage space allocated to the first volume and a storage space allocated to the second volume, together with the volume management request Req_VM. Storage system 910 may respectively allocate storage spaces of physically different disks to the first and second volumes, based on the allocation information Info_allo.

Figure 23:
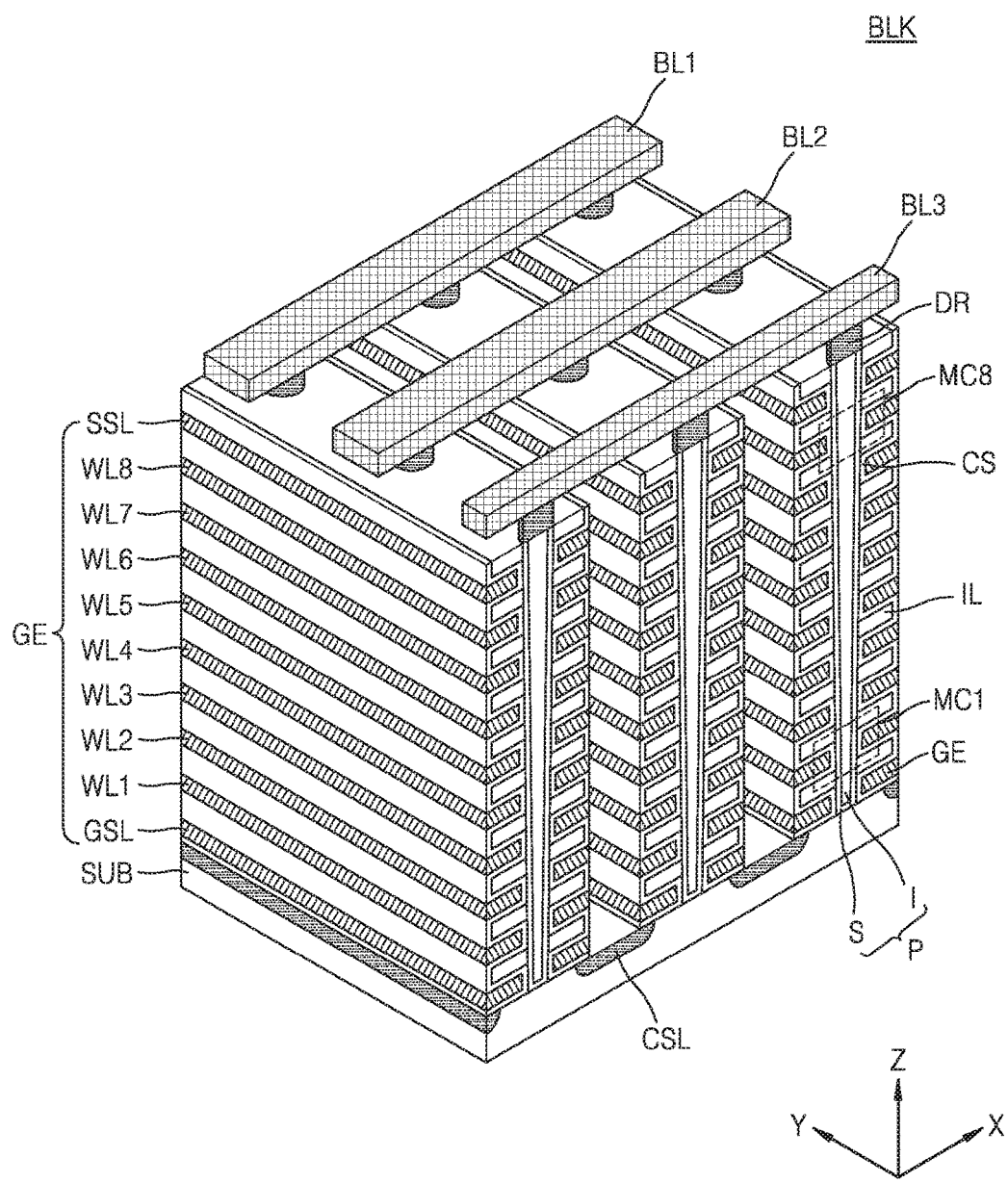
FIG. 23 is a sectional view illustrating an example of an implementation of a storage medium described in the above embodiments.

FIG. 23 is a sectional view illustrating an example of an implementation of a storage medium described in the above embodiments. For example, a storage medium may correspond to a three-dimensional (3D) flash memory including a plurality of cell blocks, and implementation of one cell block is illustrated in FIG. 23.

Referring to FIG. 23, a cell block BLK may be formed in a direction perpendicular to a substrate SUB. In FIG. 23, an embodiment is exemplified as the memory block BLK includes two selection lines GSL and SSL, eight word lines WL1 to WL8, and three bit lines BL1 to BL3. However, the number of lines included in the memory block BLK may be more or less than that illustrated in FIG. 23.

The substrate SUB may be of a first conductivity type (e.g., a p-type), and a common source line CSL that is doped with dopants (or impurities) of a second conductivity type (e.g., an n-type) and extends along a first direction (e.g., a Y-direction) may be formed on the substrate SUB. A plurality of insulating layers IL that each extend along the first direction may be provided sequentially along a third direction (e.g., a Z-direction) on a substrate area between two adjacent common source lines CSL. The plurality of insulating layers IL may be spaced apart from each other by a distance along the third direction. For example, each of the plurality of insulating layers IL may include an insulating material such as silicon oxide.

A plurality of pillars "P" that are sequentially arranged along the first direction and penetrate the plurality of insulating layers IL along the third direction may be provided on a substrate area between two adjacent common source lines CSL. For example, the plurality of pillars "P" may be in contact with the substrate SUB through the plurality of insulating layers IL. In particular, a surface layer "S" of each pillar "P" may include a silicon material of a first type and may function as a channel area. Meanwhile, an inner layer "I" of each pillar "P" may include an insulating material such as silicon oxide or an air gap.

In an area between two adjacent common source lines CSL, a charge storage layer CS may be provided along exposed surfaces of the insulating layers IL, the pillars "P", and the substrate SUB. The charge storage layer CS may include a gate insulating layer (or referred to as a "tunneling insulating layer"), a charge trap layer, and a blocking insulating layer. For example, the charge storage layer CS may have an oxide-nitride-oxide (ONO) structure. Furthermore, in an area between two adjacent common source lines CSL, gate electrodes GE such as the selection lines GSL and SSL and the word lines WL1 to WL8 may be provided on an exposed surface of the charge storage layer CS.

Drains or drain contacts DR may be provided on the plurality of pillars "P," respectively. For example, each of the drains or drain contacts DR may include a silicon material which is doped with dopants of the second conductivity type. The bit lines BL1 to BL3 that extend in a second direction (e.g., an X-direction) and are spaced apart from each other by a distance along the first direction may be provided on the drains DR.

It should be understood that the embodiments described herein should be considered in a descriptive sense only and not for purposes of limitation. Descriptions of the features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of managing volumes of a storage system that comprises a plurality of storage media, the method comprising:

the storage system receiving from an external host: (1) a data access request for a first volume of the storage system, and (2) a volume management request including correlation information identifying one or more second volumes which correspond to the first volume to constitute a redundant array of inexpensive devices (RAID) with the first volume, wherein the correlation information indicates information of the first volume and the one or more second volumes in which the allocated storage media are physically isolated from each other;

the storage system storing in a table the correlation information received from the external host identifying the one or more second volumes which correspond to the first volume to constitute the RAID; and the storage system allocating storage spaces of the storage media to the first volume and the one or more second volumes based on the correlation information between the volumes received from the host, and without the storage system performing a RAID algorithm.

2. The method of claim 1, wherein the volume management request comprises a request for creating a first volume and a request for creating the one or more second volumes.

3. The method of claim 2, wherein the receiving of the correlation information comprises:

receiving first RAID information corresponding to the request for creating the first volume and second RAID information corresponding to the request for creating the second volume.

4. The method of claim 1, wherein the storage system comprises one or more solid state disks, each solid state disk comprising one or more flash memory chips as the storage media, and wherein storage spaces of different physical flash memory chips are respectively allocated to correlated volumes based on the correlation information.

5. The method of claim 1, wherein the storage system comprises a processor that manages the volumes in response to various volume-related requests from the external host, wherein the receiving of the correlation information comprises receiving, at the processor, the correlation information, and wherein a predictor generates the correlation information by determining Internet Protocol (IP) information of the external host or an access pattern of the volumes based on various requests from the external host.

6. The method of claim 1, wherein the allocating is performed further with reference to information of the storage media included in the storage system.

7. The method of claim 6, wherein the information of the storage media comprises at least one of: (1) information about whether a defect occurs for each of the storage media, and (2) information about a probability that a defect occurs for each of the storage media, and wherein when it is determined that a first volume and a second volume constitute one RAID, a storage space of a one of the storage media, in which a probability that a defect occurs is less than a defined threshold, is allocated to at least one of the first volume and the second volume.

8. A storage system, comprising:

a storage device comprising a plurality of storage media having a plurality of storage spaces;

a processing unit; and a memory configured to store therein instructions executable by the processing unit to cause the processing unit to manage volumes in the storage device by assigning storage spaces of the storage media to the volumes based on correlation information between the volumes, wherein the correlation information is received by the storage system from an external host which also generates data access requests for the storage device, and wherein the correlation information identifies one or more second volumes which correspond to the first volume to constitute a redundant array of inexpensive devices (RAID) with the first volume, wherein the correlation information indicates information of the volumes in which the allocated storage media are physically isolated from each other wherein the storage system stores in a table the correlation information received from the external host identifying the one or more second volumes which correspond to the first volume to constitute the RAID, and wherein the storage system is configured to allocate storage spaces of the storage media to the first volume and the one or more second volumes based on the correlation information between the volumes received from the host, and without the storage system performing a RAID algorithm.

9. The storage system of claim 8, wherein execution of the instructions causes the processing unit to assign the storage spaces of the storage media to the volumes in response to receiving at least one volume management request from the host.

10. The storage system of claim 9, wherein the volume management request comprises a request for creating the first volume and a request for creating the one of more second volumes, and wherein the correlation information indicates that the first volume and the second volume constitute one redundant array of inexpensive disks (RAID).

11. The storage system of claim 9, further comprising receiving the correlation information from the host by receiving first RAID information corresponding to the request for creating the first volume and second RAID information corresponding to the request for creating the second volume.

12. The storage system of claim 8, wherein execution of the instructions causes the processing unit to manage the volumes in response to various volume-related requests from the external host, and wherein the memory is further configured to store therein additional instructions executable by the processing unit to cause the processing unit to predict the correlation information from at least one of: information about the external host, and an access pattern of the volumes based on various requests from the host.

13. The storage system of claim 8, wherein execution of the instructions causes the processing unit to manage the volumes in response to various volume-related requests from the external host, and wherein the storage system further comprises a predictor configured to predict the correlation information from at least one of: information about the external host, and an access pattern of the volumes based on various requests from the external host.

* * * * *